US010162426B2

(12) United States Patent
Nomura et al.

(10) Patent No.: US 10,162,426 B2
(45) Date of Patent: Dec. 25, 2018

(54) CHARACTER STRING INPUT SYSTEM

(71) Applicant: SONY COMPUTER ENTERTAINMENT INC., Tokyo (JP)

(72) Inventors: Masanori Nomura, Tokyo (JP); Tomohiro Ogawa, Kanagawa (JP); Satoru Matsuda, Tokyo (JP); Takenori Oshima, Tokyo (JP); Junichi Naoi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 546 days.

(21) Appl. No.: 14/766,584

(22) PCT Filed: Feb. 13, 2014

(86) PCT No.: PCT/JP2014/053346
§ 371 (c)(1),
(2) Date: Aug. 7, 2015

(87) PCT Pub. No.: WO2014/129378
PCT Pub. Date: Aug. 28, 2014

(65) Prior Publication Data
US 2015/0370342 A1    Dec. 24, 2015

(30) Foreign Application Priority Data

Feb. 20, 2013    (JP) ................ 2013-031469

(51) Int. Cl.
*G06F 3/0488*    (2013.01)
*G06F 3/02*    (2006.01)
(Continued)

(52) U.S. Cl.
CPC .............. *G06F 3/0227* (2013.01); *G06F 3/02* (2013.01); *G06F 3/04886* (2013.01);
(Continued)

(58) Field of Classification Search
CPC ... G06F 3/00; G06F 3/02; G06F 3/023; G06F 3/0233; G06F 3/04; G06F 3/041;
(Continued)

(56) References Cited

U.S. PATENT DOCUMENTS

2003/0017873 A1* 1/2003 Ohara .................... A63F 13/10
463/42
2003/0088623 A1* 5/2003 Kusuda .................. H04L 12/66
709/204
(Continued)

FOREIGN PATENT DOCUMENTS

JP    10-039977 A    2/1998
JP    2002-325965 A    11/2002
(Continued)

OTHER PUBLICATIONS

International Search Report dated May 13, 2014, from the corresponding PCT/JP2014/053346.
(Continued)

*Primary Examiner* — Xiomar L Bautista
(74) *Attorney, Agent, or Firm* — Katten Muchin Rosenman LLP

(57) ABSTRACT

The present invention is intended to realize character string input using two or more devices by an efficient technique. A character string input system includes a first information processing apparatus and a second information processing apparatus. The first information processing apparatus acquires an operation done on a first input device and acquires a first character string on the basis of the acquired operation. The second information processing apparatus acquires an operation done on a second input device and acquires a second character string on the basis of the acquired operation. The first information processing apparatus outputs an input character string on the basis of the first character string acquired by the time input of the second (Continued)

character string is started by use of the second input device and the second character string.

7 Claims, 19 Drawing Sheets

(51) Int. Cl.
G06F 17/21 (2006.01)
G06F 17/27 (2006.01)
G06F 17/24 (2006.01)

(52) U.S. Cl.
CPC .............. *G06F 17/21* (2013.01); *G06F 17/24* (2013.01); *G06F 17/276* (2013.01)

(58) Field of Classification Search
CPC ........ G06F 3/048; G06F 3/0488; G06F 13/00; G06F 17/21; G06F 17/24; G06F 17/27; A63F 9/24; A63F 13/00; A63F 13/12; H03M 11/00; H03M 11/04
See application file for complete search history.

(56) References Cited

U.S. PATENT DOCUMENTS

| | | |
|---|---|---|
| 2004/0268250 A1 | 12/2004 | Danker et al. |
| 2005/0021624 A1* | 1/2005 | Herf .................... H04L 12/1822 709/204 |
| 2005/0223078 A1* | 10/2005 | Sato ..................... G06Q 10/107 709/207 |
| 2008/0303793 A1 | 12/2008 | Carroll |
| 2009/0081950 A1 | 3/2009 | Matsubara et al. |
| 2013/0084978 A1* | 4/2013 | Olomskiy ........... G07F 17/3211 463/31 |
| 2013/0219284 A1* | 8/2013 | Kim .................. G06F 17/30165 715/739 |
| 2015/0244656 A1* | 8/2015 | Choi .................. H04N 21/4788 709/206 |

FOREIGN PATENT DOCUMENTS

| | | |
|---|---|---|
| JP | 2005-078107 | 3/2005 |
| JP | 2007-148589 A | 6/2007 |
| JP | 2009-080593 A | 4/2009 |
| JP | 2010-529560 | 8/2010 |
| JP | 2011-129158 A | 6/2011 |
| WO | 2008/151114 A1 | 12/2008 |

OTHER PUBLICATIONS

International Preliminary Report on Patentability and Written Opinion of the International Searching Authority dated Sep. 3, 2015 from corresponding Application No. PCT/JP2014/053346.

* cited by examiner

FIG. 5
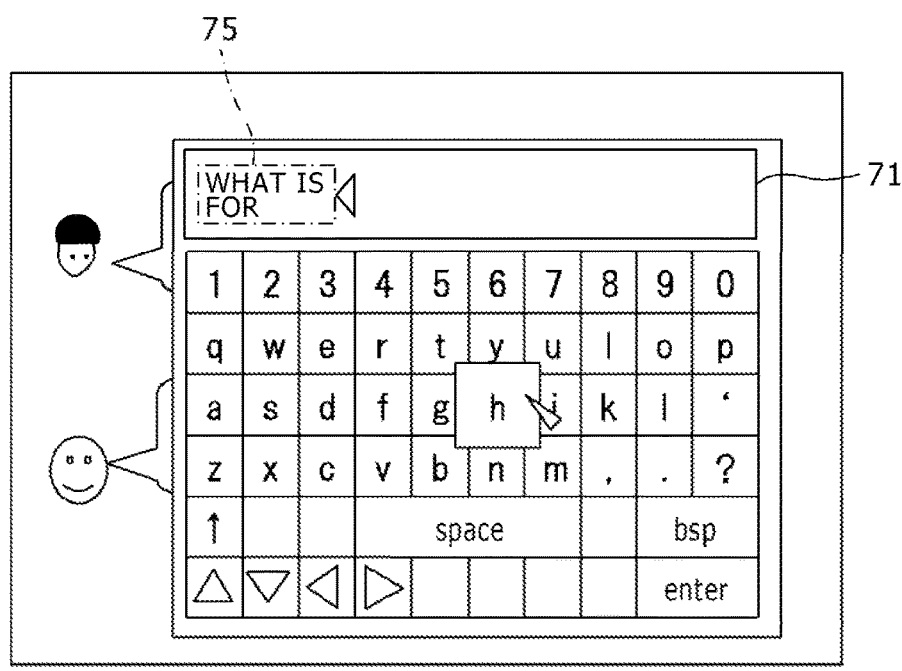
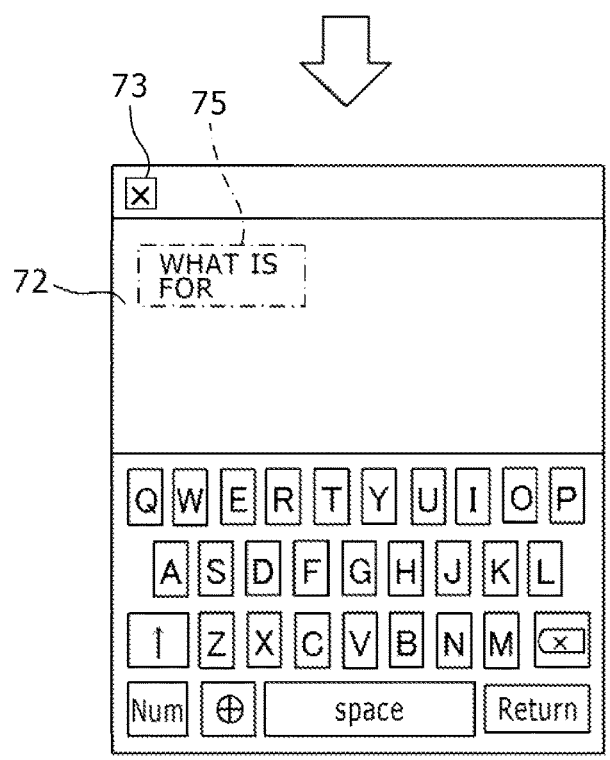

FIG.6
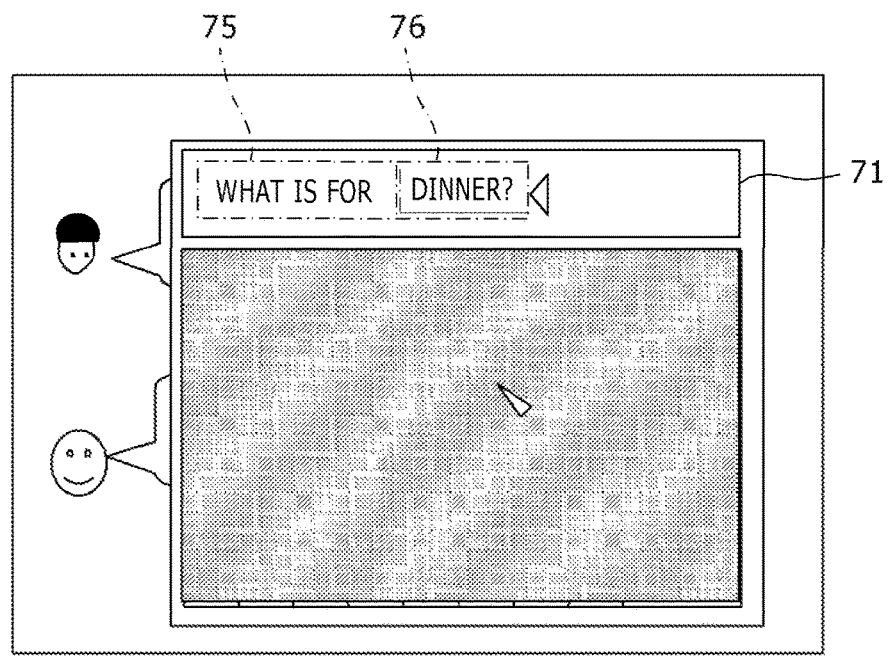
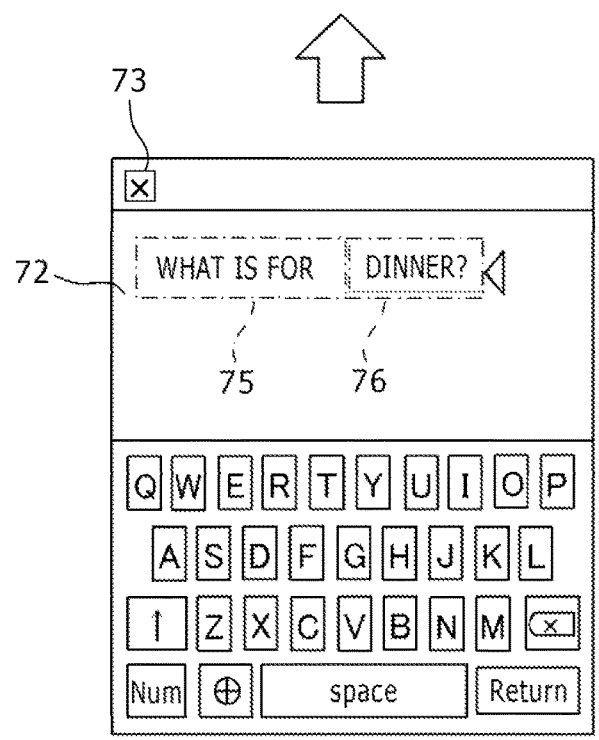

FIG.7
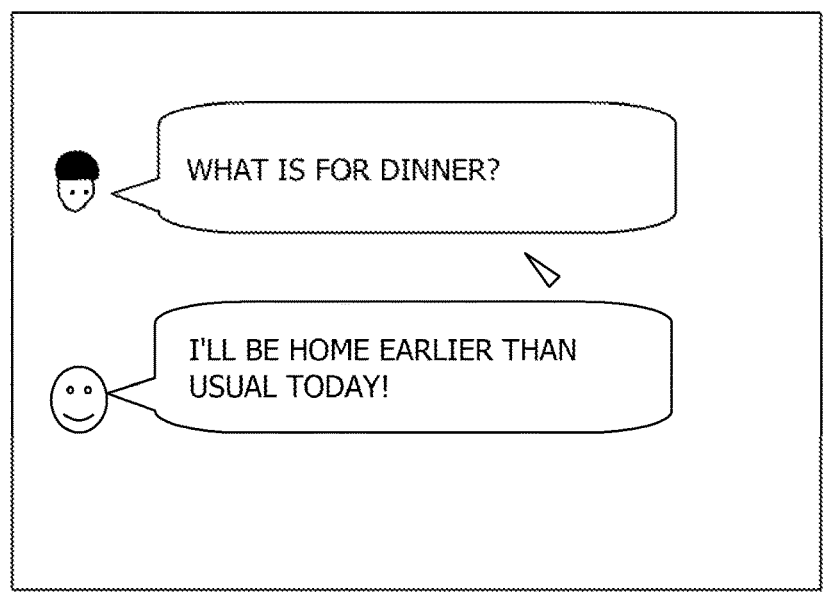
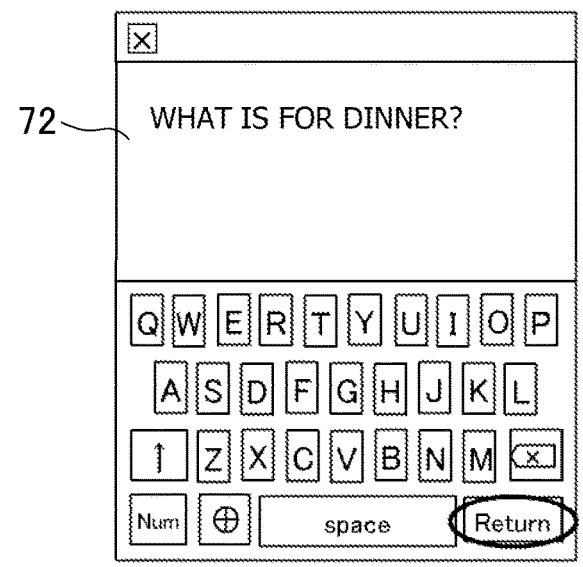

FIG.19
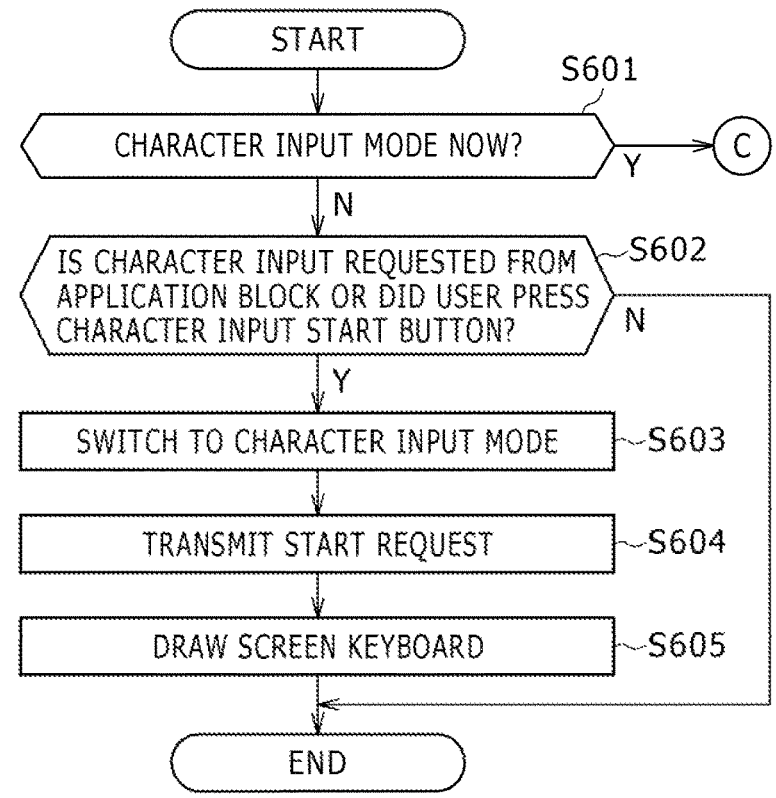
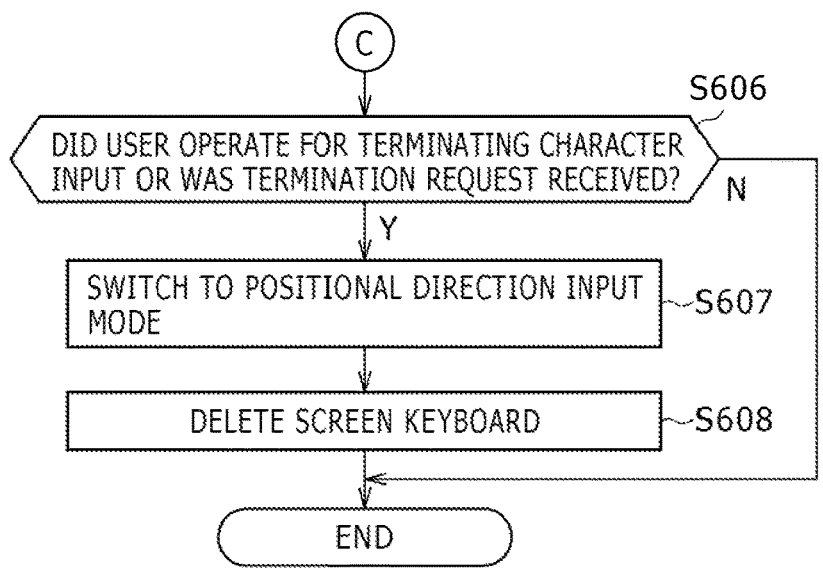

CHARACTER STRING INPUT SYSTEM

TECHNICAL FIELD

The present invention relates generally to a character input system, a character string input method, a character string input apparatus, a terminal apparatus, a program, and a computer-readable information storage medium.

BACKGROUND ART

Information devices attached with a game controller and a remote controller (hereafter referred to generically as "controller") that are a type of pointing devices are known, such as stationary game machines and home video recorders. With these information devices, it is a general practice to input characters by moving a pointer on an on-screen keyboard displayed on a display device such as a television by a controller. In such an input method, a character string input operation is executed by moving the pointer to key positions displayed on the screen. PTL 1 below discloses a technology in which characters are inputted by use of an on-screen keyboard.

On the other hand, it is a general practice to execute a character input operation by use of a touch panel on a mobile information terminal, such as a smartphone and a tablet terminal.

In addition, there is a remote operation technology in which image data is transmitted in real time from a host apparatus that executes an application program such as a stationary game machine that executes game software to a terminal apparatus for operation and data inputted through the terminal apparatus is transmitted to the host apparatus, thereby making available resources of the host apparatus without user attendance at the host apparatus.

CITATION LIST

Patent Literature

[PTL 1]
Japanese Patent Laid-Open No. 2007-148589

SUMMARY

Technical Problems

Now, it is considered that, in inputting a character string into a stationary game machine or home video recorder, not only character input by use of a controller but character input by use of a mobile information terminal is practicable. In making two or more input methods practicable, processing is required for solving the contention of input operations done by the both, but the processing for solving this contention has not been easy.

In addition, in a remote operation technology, it is practicable to input characters by use of a character input function provided by a host apparatus. To be more specific, the host apparatus draws an image for character input such as a screen keyboard and the information created by an operation by a user done on that image is passed to the host apparatus, thereby inputting characters. In this method, character input is difficult if there is characteristics difference in screen size or input device configuration between the host apparatus and the terminal apparatus. In order to overcome this problem, use of a character string input function provided by the terminal apparatus is possible. To be more specific, it is considered that the terminal apparatus draws an image for character input and characters are inputted on the basis of an operation executed on the drawn image for character input. In this case, at least a portion of an image that is drawn by the host apparatus on the basis of the image for character input drawn by the terminal apparatus and transmitted to the terminal apparatus is hidden.

The present invention has been made in view of the problems described above, and it is an object of the present invention to provide a technology of realizing character string input based on two or more input devices in a technique that is more efficient than in the case in which this configuration is not provided.

Another object of the present invention is to provide a technology of suppressing effects of hiding of at least a portion of an image for character input that is transmitted from a host apparatus if the image for character input is drawn by a terminal apparatus.

Solution to Problems

In order to solve the problems, according to the present invention, there is provided a character input system including a first information processing apparatus and a second information processing apparatus. The first information processing apparatus has: a first operation acquisition block configured to acquire an operation done on a first input device; a character string acquisition block configured to acquire a first character string on a basis of the acquired operation; and a character string output block configured to output an input character string. The second information processing apparatus has: a second operation acquisition block configured to acquire an operation done on a second input device; and a character string input block configured to acquire a second character string on a basis of the acquired operation. The character string output block outputs the input character string on a basis of the first character string acquired by the character string acquisition block by a time input of the second character string is started by use of the second input device and the second character string.

Further, according to the present invention, there is provided a character string input apparatus including: an operation acquisition block configured to acquire an operation done on an input device; a character string acquisition block configured to acquire a character string on a basis of the acquired operation; and a character string output block configured to output an input character string decided on a basis of a character string acquired by the character string acquisition block by a time input of a character string is started by use of another character string input apparatus and a character string inputted in the another character string input apparatus.

Further, according to the present invention, there is provided a program having a computer function as: an operation acquisition block configured to acquire an operation done on an input device; a character string acquisition block configured to acquire a character string on a basis of the acquire operation; and a character string output block configured to output an input character string decided on a basis of a character string acquired by the character string acquisition block by a time input of a character string is started by use of another character string input apparatus and a character string inputted in the another character string input apparatus.

Further, according to the present invention, there is provided a computer-readable storage medium storing the program mentioned above.

Further, according to the present invention, there is provided another character string input apparatus including: an operation acquisition block configured to acquire an operation done on an input device; a character string acquisition block configured to acquire an additional character string on a basis of the acquired operation; and a transmission block configured to transmit a signal indicative that input of a character string is started by use of the input device.

Further, according to the present invention, there is provided another program having a computer function as: an operation acquisition block configured to acquire an operation done on an input device; a character string acquisition block configured to acquire an additional character string on a basis of the acquired operation; and a transmission block configured to transmit a signal indicative that input of a character string is started by use of the input device.

Further, according to the present invention, there is provided a computer-readable storage medium storing the another program mentioned above.

Further, according to the present invention, there is provided a character string input method including: a step of acquiring an operation done on a first input device; a step of acquiring a first character string on a basis of the operation done on the first input device; a step of acquiring an operation done on a second input device; a step of acquiring a second character string on a basis of the operation done on the second input device; and a step of outputting an input character string on a basis of the first character string acquired on a basis of the operation done on the first input device by a time input of the second character string is started by use of the second input device and the second character string.

According to the present invention, character string input by use of two or more input devices can be realized by a technique more efficient than in the cases where the present configuration is not adopted.

In one mode of the present invention, the second information processing apparatus may further have a transmission block configured to transmit a signal indicative that input of the second character string by use of the second input device is started; the first information processing apparatus may further have a reception block configured to receive the signal transmitted from the second information processing apparatus; and if the signal is received, the character string acquisition block may restrict input of a character string by use of the first input device.

In this mode, character string input by use of two or more input devices can be realized with a simple technique.

In one mode of the present invention, the first information processing apparatus may further have a transmission block configured to transmit the first character string acquired by the character string acquisition block; the second information processing apparatus may further have a reception block configured to receive the transmitted first character string; the character string input block may decide the input character string on a basis of the received character string and the additional character string; and the character string output block may output the decided input character string.

In one mode of the present invention, the first information processing apparatus may decide whether or not an ID associated with startup of a character input processing in the first information processing apparatus matches an ID associated with the second information processing apparatus; and if there is no match, then character string input by the second information processing apparatus may be restricted.

According to this mode, occurrence of the contention caused by the input of character strings by two or more users through input devices different from each other can be suppressed.

According to the present invention, there is provided a terminal apparatus including: reception means for receiving a start request indicative of a request for starting character input from a host apparatus; display control means for having display means display, if the start request is received from the host apparatus, a character identification image for allowing a user to identify a character; and transmission means for transmitting information indicative of a character identified by the user to the host apparatus on a basis of an operation done on the character identification image by the user.

According to the present invention, there is provided another character string input method including: a step of receiving a start request indicative of a request for starting character input from a host apparatus; a step of having display means display, if the start request is received from the host apparatus, a character identification image for allowing a user to identify a character; and a step of transmitting information indicative of the character identified by the user to the host apparatus on a basis of an operation done on the character identification image by the user.

According to the present invention, there is provided another program having a computer execute processing of: receiving a start request indicative of a request for starting character input from a host apparatus; having display means display, if the start request is received from the host apparatus, a character identification image for allowing a user to identify a character; and transmitting information indicative of the character identified by the user to the host apparatus on a basis of an operation done on the character identification image by the user.

Further, according to the present invention, there is provided another computer-readable storage medium storing the above-mentioned program.

According to the present invention, if an image for character input is drawn on a terminal apparatus, an effect due to that at least part of an image transmitted from a host apparatus is hidden can be suppressed.

In one mode of the present invention, the reception means may repeatedly receive image data indicative of a host image transmitted from the host apparatus; and the display control means may have the display means display, every time the image data is received before the start request is received, a host image indicated by the image data concerned and may have the display means display, after reception of the start request, an image different from the host image and including the character identification image.

In one mode of the present invention, the terminal apparatus may further include means for deciding whether input of a character string by the user is terminated on a basis of an operation done by the user; if input of a character string by the user is found terminated, the display control means may have the display means display an image with the character identification image deleted; and if input of a character string by the user is found terminated, the transmission means may transmit a termination request for requesting transmission of image data indicative of an image that does not include an area in which the host apparatus allows the user to identify a character.

In one mode of the present invention, the display control means may have the display means display an image with the host image and the character identification image superimposed on each other after reception of the start request.

In one mode of the present invention, of the image data, image data after transmission of the start request may be indicative of the host image including a host character input image for selecting a character; and if the start request is received, the display control means may have the display means display such that the host character input image is covered by the character identification image.

BRIEF DESCRIPTION OF DRAWINGS

FIG. 5 is a diagram illustrating one example of images that are outputted while input is executed on the side of the game apparatus.

FIG. 6 is a diagram illustrating one example of images that are outputted after character string input is started on the mobile terminal.

FIG. 7 is a diagram illustrating one example of images that are outputted when an input character string is decided.

FIG. 19 is a diagram illustrating one example of a processing flow of a character string decision unit related with start and end of character string input.

DESCRIPTION OF EMBODIMENTS

This invention will be described in further detail by way of embodiments with reference to the accompanying drawings. It should be noted that, of components that will appear below, those having same functions are denoted by same reference signs and skipped in description.

First Embodiment

Figure 1:
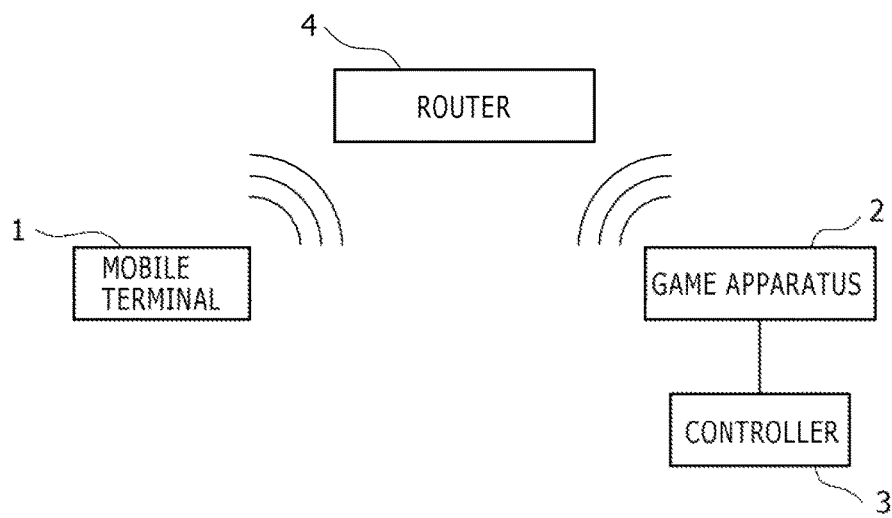
FIG. 1 is a diagram illustrating one example of an information processing system practiced as a first embodiment.

Now, referring to FIG. 1, there is shown a diagram illustrating one example of an information processing system practiced as the first embodiment of the present invention. This information processing system has a mobile terminal 1, a game apparatus 2, and a controller 3. The mobile terminal 1 is an information terminal, such as a smartphone, a tablet terminal, or a mobile game machine. The game apparatus 2 is a stationary home game machine, for example. The controller 3 is a game controller and is connected to the game apparatus 2 in a wired or wireless manner. The controller 3 has sticks and buttons for inputting directions.

The mobile terminal 1 and the game apparatus 2 are connected to a network, to be more specific, a LAN that includes a router 4. The router 4 is a wireless LAN router for example that communicates with the mobile terminal 1 and the game apparatus 2 in a wireless manner, thereby providing communication between the mobile terminal 1 and the game apparatus 2.

Figure 2:
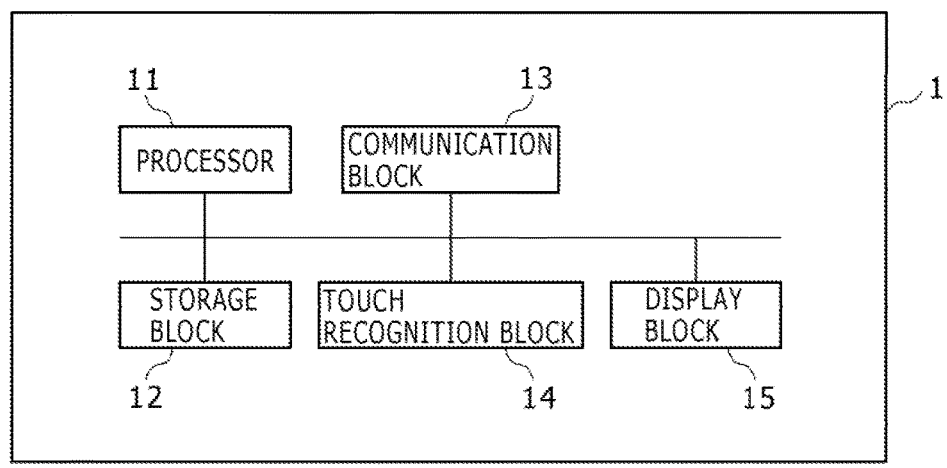
FIG. 2 is a diagram illustrating a hardware configuration of a mobile terminal.
Figure 3:
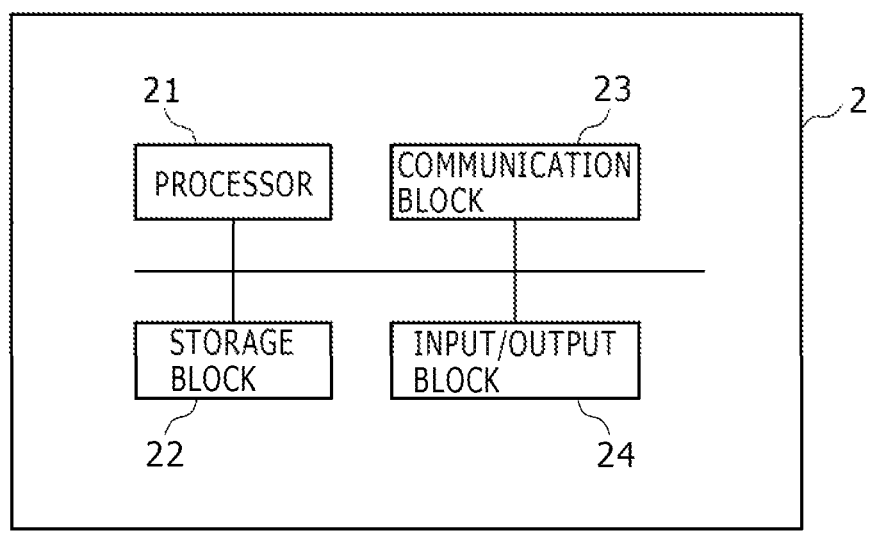
FIG. 3 is a diagram illustrating a hardware configuration of a game apparatus.

Referring to FIG. 2, there is shown a diagram illustrating one example of a hardware configuration of the mobile terminal 1. The mobile terminal 1 has a processor 11, a storage block 12, a communication block 13, a touch recognition block 14, and a display block 15. FIG. 3 is a diagram illustrating one example of a hardware configuration of the game apparatus 2. The game apparatus 2 has a processor 21, a storage block 22, a communication block 23, and an input/output block 24.

The processors 11 and 21 operate as instructed by programs stored in the storage blocks 12 and 22 so as to control the communication blocks 13 and 23, the input/output block 24, and so forth. It should be noted that the programs mentioned above may be provided as stored in a computer-readable storage medium such as a flash memory or through a network such as the Internet.

The storage blocks 12 and 22 are each configured by a memory element such as a DRAM or a flash memory. The storage blocks 12 and 22 store the programs mentioned above. In addition, the storage blocks 12 and 22 store information and computation results inputted from each block.

The communication blocks 13 and 23 are each configured by an integrated circuit, an antenna, and so on that make up a wireless LAN. The communication blocks 13 and 23 each have a function of communicating with other apparatuses through a network device such as the router 4. It should be noted that the communication block 23 of the game apparatus 2 may have a terminal or a circuit for the connection with a wired LAN. On the basis of control of the processors 11 and 21, the communication blocks 13 and 23 inputs information received from other apparatuses into the processors 11 and 21 and the storage blocks 12 and 22 and transmits information to other apparatuses.

The touch recognition block 14 is used to detect a touch operation done by a user and is a touch panel for example. In what follows, description will be made with the touch recognition block 14 being a touch panel. The touch recognition block 14 is a type of input device that detects the position on which a user finger touched and passes that position to the processor 11. The display block 15 is an image output device that displays images to the user and is a liquid crystal display panel or an organic EL display panel for example. An area in which the touch recognition block 14 recognizes the touch or proximity of a finger for example overlaps with a display area of the display block 15 in a planar view.

The input/output block 24 is configured by means of controlling a display output device such as a display and means of controlling an input device such as the controller 3. On the basis of control of the processor 21, the input/output block 24 outputs image data and so on to a display output device and gets a user operation from an input device.

In this information processing system, character strings can be inputted by use of both the mobile terminal 1 and the controller 3. First, an overview of inputting character strings through this information processing system will be described by use of examples.

Figure 4:
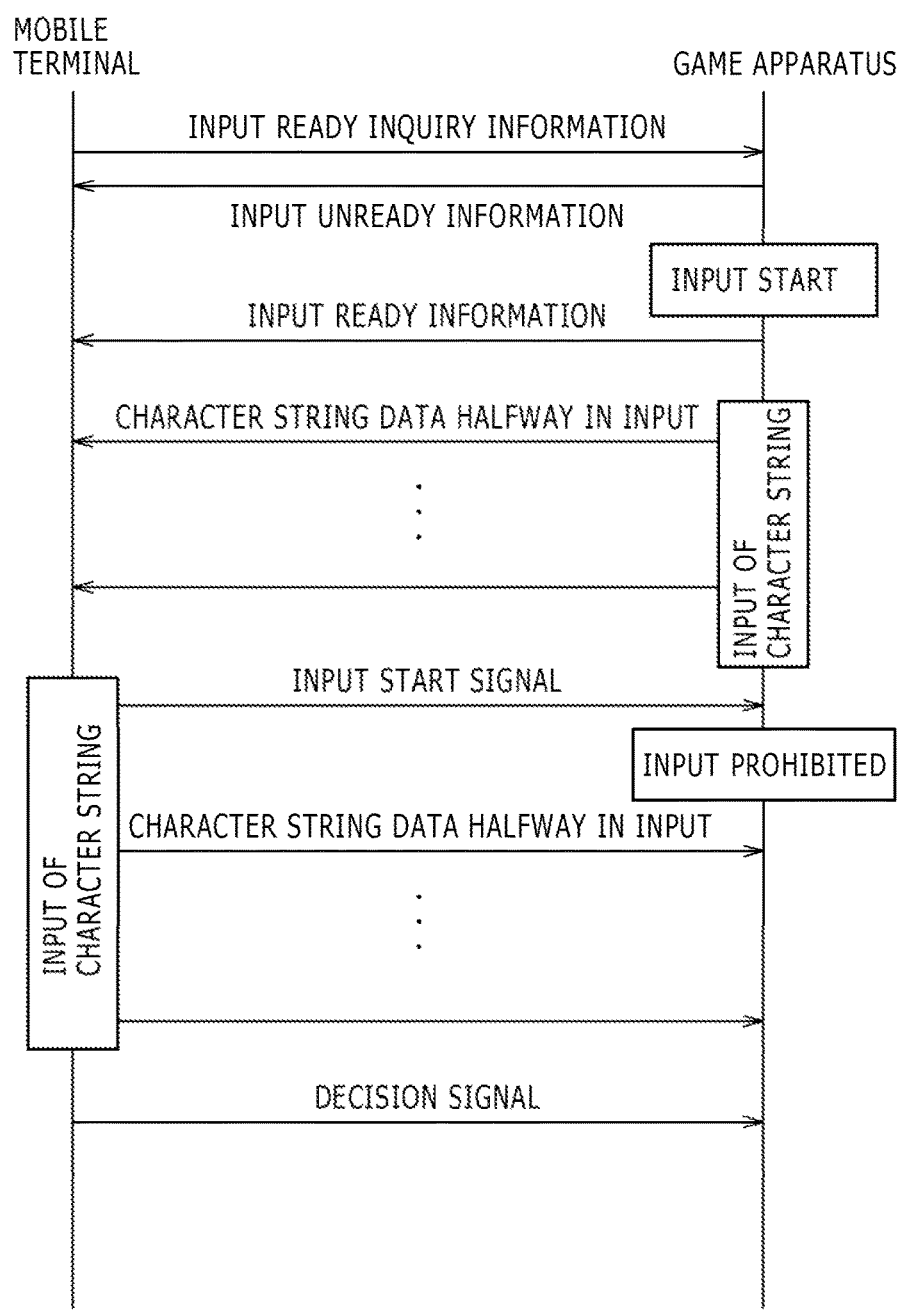
FIG. 4 is diagram illustrating one example of a sequence of communication that takes place between the mobile terminal and the game apparatus when character string input is executed.

Referring to FIG. 4, there is shown a diagram illustrating one example of a communication sequence that takes place between the mobile terminal 1 and the game apparatus 2 when a character string is inputted. First, when the user starts up remote character string input processing of the mobile terminal 1, the mobile terminal 1 inquires the game apparatus 2 if character string input is ready or not. In doing so, the mobile terminal 1 transmits input ready inquiry information to the game apparatus 2. The game apparatus 2 transmits input unready information to the mobile terminal 1 indicative that character string input is unready before the startup of character string input processing on the side of the game apparatus 2. Then, when character string input becomes ready upon startup of character string input processing from an application program on the side of the game apparatus 2, the game apparatus 2 transmits input ready information indicative that character string input is ready to the mobile terminal 1.

In this state, the game apparatus 2 displays an on-screen keyboard on a television screen indicating that character string input from the controller 3 is ready. In addition, character string input is also ready at the mobile terminal 1.

Then, every time a character is inputted by use of the controller 3 of the game apparatus 2 or an operation such as predictive input or kanji (Chinese character) conversion is done, the game apparatus 2 transmits character string data halfway through that input or edit to the mobile terminal 1. This transmission is continued until a character string to be inputted in an application program is decided by an operation of the controller 3, character string input processing is terminated by an operation of the controller 3, or an operation for starting some character input is done at the mobile terminal 1.

Referring to FIG. 5, there is shown a diagram illustrating one example of images that are outputted during character string input on the side of the game apparatus 2. The screen shown in the upper of this diagram is a screen to be displayed by the game apparatus 2 onto a television or the like and the screen shown in the lower of this diagram is a screen to be displayed in a display area of the mobile terminal 1. In the example of this diagram, executing input and conversion of a character string by pressing buttons of the on-screen keyboard by use of the controller 3 connected to the game apparatus 2 inputs a character string 75 "WHAT IS FOR" halfway through input and edit (in the case of FIG. 4, the input character string is part of a character string that is finally decided, so that the input character string is also referred to as "partial character string" for convenience). This partial character string 75 is displayed on a character string display column 71 of a screen to be displayed by the game apparatus 2. In addition, the game apparatus 2 transmits data of the character string 75 halfway through input and edit to the mobile terminal 1. The mobile terminal 1 also outputs this partial character string 75 to a character string display column 72 on a screen of the mobile terminal 1. It should be noted that the screen of the mobile terminal 1 has a close button 73, pressing of which terminates the remote character string input processing of the mobile terminal 1. It should be noted that there is a case in which a partial character string itself provides the whole of a character string that is finally decided.

Here, it may be considered that, after inputting a partial character string of some degree by the user through the controller 3, a character string is additionally inputted or edited for the inputted partial character string by use of the mobile terminal 1. When the user starts input or edit of a character string from the mobile terminal 1, the mobile terminal 1 transmits an input start signal indicative of the start of input or edit of a character string by the user to the game apparatus 21. Then, the game apparatus 2 prohibits the character string input done by use of the controller 3. Further, every time an operation is executed such as input of a character, kanji conversion, or edit, the mobile terminal 1 transmits the data of the character string halfway through input and edit to the game apparatus 2.

Referring to FIG. 6, there is shown a diagram illustrating one example of images that are outputted after the start of a character string input on the mobile terminal 1. It is seen from the character string display column 72 of the mobile terminal 1 that "DINNER?" of a partial character string 76 before kanji conversion has been inputted in addition to "WHAT IS FOR" of the partial character string 75 inputted by use of the controller 3 at the game apparatus 2. Subsequently, a character string to be inputted at the mobile terminal 1 is also referred to as "additional character string" for convenience. This is because, in the case shown in FIG. 4, additional character strings are often added to partial character strings; in another case, there is no partial character string but an additional character string exists. Data of a character string "WHAT IS FOR DINNER?" consisting of the partial character string 75 ("WHAT IS FOR") and the additional character string 76 ("DINNER?") is transmitted from the mobile terminal 1 to the game apparatus 2, this character string being outputted to the character string display column 71 of the game apparatus 2. On the other hand, the on-screen keyboard is locked to disable key pressing on the game apparatus 2, thereby prohibiting character input. It should be noted that, if the close button 73 is pressed in this state, then the remote character string input processing of the mobile terminal 1 is terminated and, at the same time, input and edit of a character string by use of the on-screen keyboard of the game apparatus 2 become ready.

As shown in FIG. 4, when the user executes an operation for deciding a character string (an input character string) to be inputted in an application program in completing the input and edit of the character string to be passed to the application program on the side of the mobile terminal 1, the mobile terminal 1 transmits a decision signal indicative that an input character string has been decided to the game apparatus 2. Then, the game apparatus 2 decides the character string inputted or edited so far as the input character string and passes this input character string to the application program that started up the character string input processing of the game apparatus 2.

Referring to FIG. 7, there is shown a diagram illustrating one example of images that are outputted upon decision of an input character string. When the user presses "Return" button indicative of the decision of an input character string on the mobile terminal 1, a decision signal is transmitted to the game apparatus 2. Further, in the game apparatus 2, this input character string is passed to the application program which displays the received input character string on the screen displayed thereby. It should be noted that, although not shown in FIG. 7, after transmitting the decision signal, the mobile terminal 1 displays an image indicative of an input wait state, thereby preventing the user from executing an input operation.

It is presupposed that the operations of the mobile terminal 1 and the game apparatus 2 be not executed for input through the controller 3 until an input character string is decided in the mobile terminal 1 after switching from input through the controller 3 to input through the mobile terminal 1 or until remote character string input processing from the mobile terminal 1 is terminated. On the other hand, while the user is inputting a character string by use of the touch panel of the mobile terminal 1, it is considered that the necessity of going to the trouble of inputting a character string from the controller 3 is minimal. Therefore, the substantial convenience would not be lowered in such a presupposition.

The following describes details of functions and processing that realize the sequence mentioned above.

Figure 8:
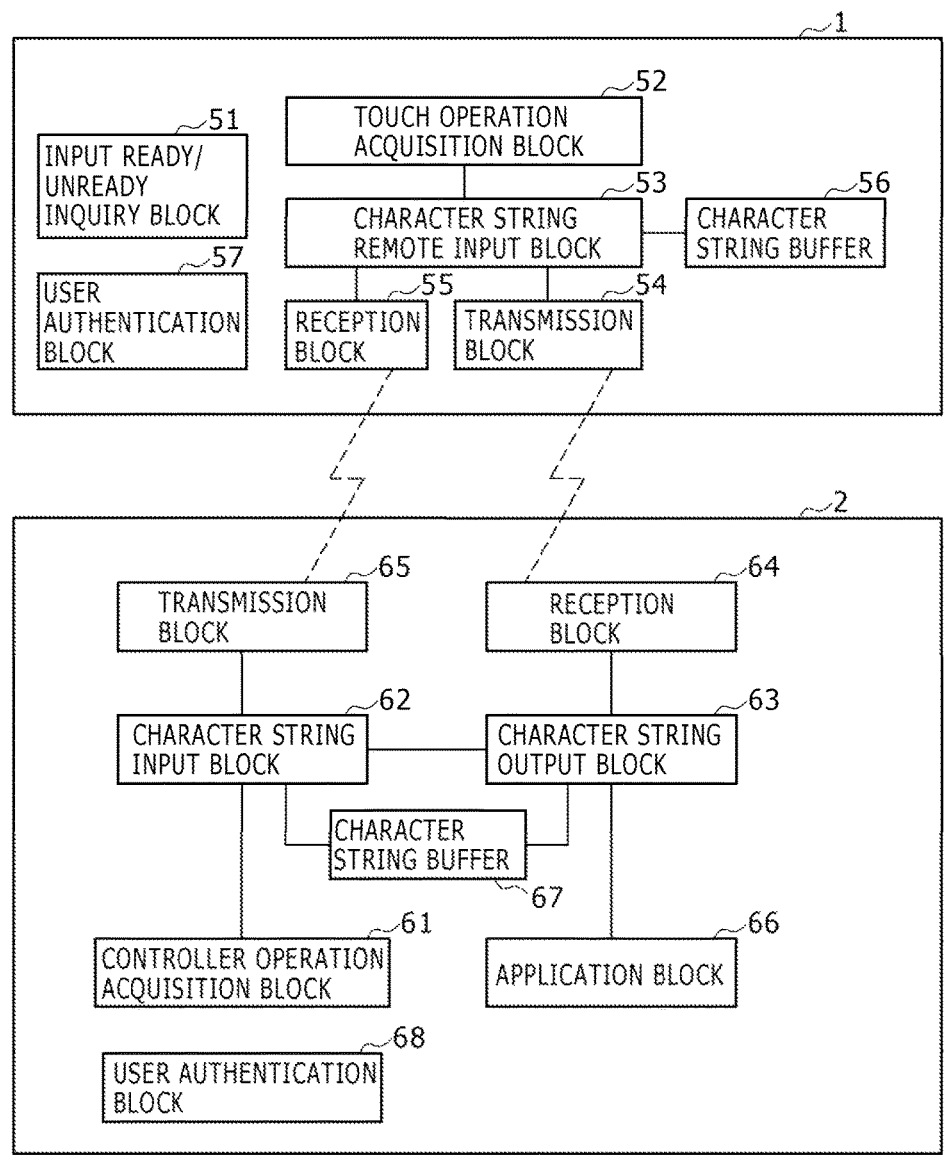
FIG. 8 is a block diagram illustrating functions that are realized by the system practiced as the first embodiment.

Referring to FIG. 8, there is shown a block diagram illustrating functions that are realized by the system practiced as the first embodiment. The mobile terminal 1 has an input ready/unready inquiry block 51, a touch operation acquisition block 52, a character string remote input block 53, a transmission block 54, a reception block 55, a character string buffer 56, and a user authentication block 57. These functions are realized by the processor 11 executing programs stored in the storage block 12 so as to control the communication block 13 and the touch recognition block 14.

The user authentication block 57 is realized mainly by the processor 11, the storage block 12, and the communication block 13. The user authentication block 57 gets an ID and password of a user who operates the mobile terminal 1 from the user at the start or before the start of remote character string input processing and authenticates the user by use of the obtained ID and password. This user authentication processing may be executed inside the user authentication block 57 of the mobile terminal 1 or by a server (not shown) connected to the mobile terminal 1 through a network. Also, upon completion of the user authentication processing, the user authentication block 57 manages the ID of the authenticated user or an ID (account ID for example) corresponding to the user ID as an ID related with the mobile terminal 1.

The touch operation acquisition block 52 is realized mainly by the processor 11 and the touch recognition block 14. The touch operation acquisition block 52 gets operations by the user on the touch panel from time to time. It should be noted that, instead of getting operations on the touch panel by the touch operation acquisition block 52, operations on another input device suitable for character input such as a keyboard may be obtained.

The character string buffer 56 is realized mainly by the storage block 12. The character string buffer 56 stores data of a character string (equivalent to an input character string) that is halfway through input or edit.

The transmission block 54 and the reception block 55 are realized mainly by the processor 11 and the communication block 13. The reception block 55 receives a character string halfway through input and edit from the game apparatus 2 from time to time. The transmission block 54 transmits an input start signal and data of a character string halfway through input and edit.

The game apparatus 2 has a controller operation acquisition block 61, a character string input block 62, a character string output block 63, a reception block 64, a transmission block 65, an application block 66, a character string buffer 67, and a user authentication block 68. These functions are realized by the processor 21 executing programs stored in the storage block 22 so as to control the communication block 23 and the input/output block 24.

The user authentication block 68 is realized mainly by the processor 21, the storage block 22, and the communication block 23. The user authentication block 68 gets an ID and password of a user who operates the game apparatus 2 from the user before the start of character string input processing and authenticates the user by use of the obtained ID and password. This user authentication processing may be executed inside the user authentication block 68 of the game apparatus 2 or by a server (not shown) connected thereto through a network. Upon completion of the user authentication processing, the user authentication block 68 manages the ID of the authenticated user or an ID (account ID for example) corresponding to the user ID as an ID related with the game apparatus 2. The user authentication block 68 may also manage the ID related with the game apparatus 2 by relating the ID with an input device such as the controller 3. If two or more users use the game apparatus 2 at the same time, the user authentication block 68 may manage the ID (the user ID or account ID for example) of each user by relating this ID with the input device of each user. Further, the game apparatus 2 may determine on the basis of an input signal coming from which one of the input devices the character string input processing in the game apparatus 2 was started up and, in the user authentication block 68, the ID of the user related with that input device may be managed as the ID of the user who started up the character input processing. Also, the user authentication block 68 determines whether there is a match between the ID of the user related with the game apparatus 2 and the ID of the user transmitted from the mobile terminal 1. It should be noted that the user authentication block 68 may determine whether there is a match between the ID of the user who started up the character input processing of the game apparatus 2 and the ID of the user transmitted from the mobile terminal 1.

The character string buffer 67 is realized mainly by the storage block 22. The character string buffer 67 stores data (equivalent to a partial character string or an input character string) of a character string halfway through input or edit.

The controller operation acquisition block 61 is realized mainly by the processor 21 and the input/output block 24. The controller operation acquisition block 61 gets operations executed on the controller 3 from time to time.

The reception block 64 and the transmission block 65 are realized mainly by the processor 21 and the communication block 23. The reception block 64 receives an input start signal, a decision signal and the like from time to time. Also, the reception block 64 may receive an ID of a user authenticated by the user authentication block 57 of the mobile terminal 1. A method of using this ID will be described later.

The transmission block 65 transmits character string data and so on inputted and edited by use of the controller 3.

The application block 66 is realized mainly by the processor 21 and the storage block 22. The application block 66 is a process that is generated by execution of a program such as a game requiring character string input and messaging between users.

Figure 9:
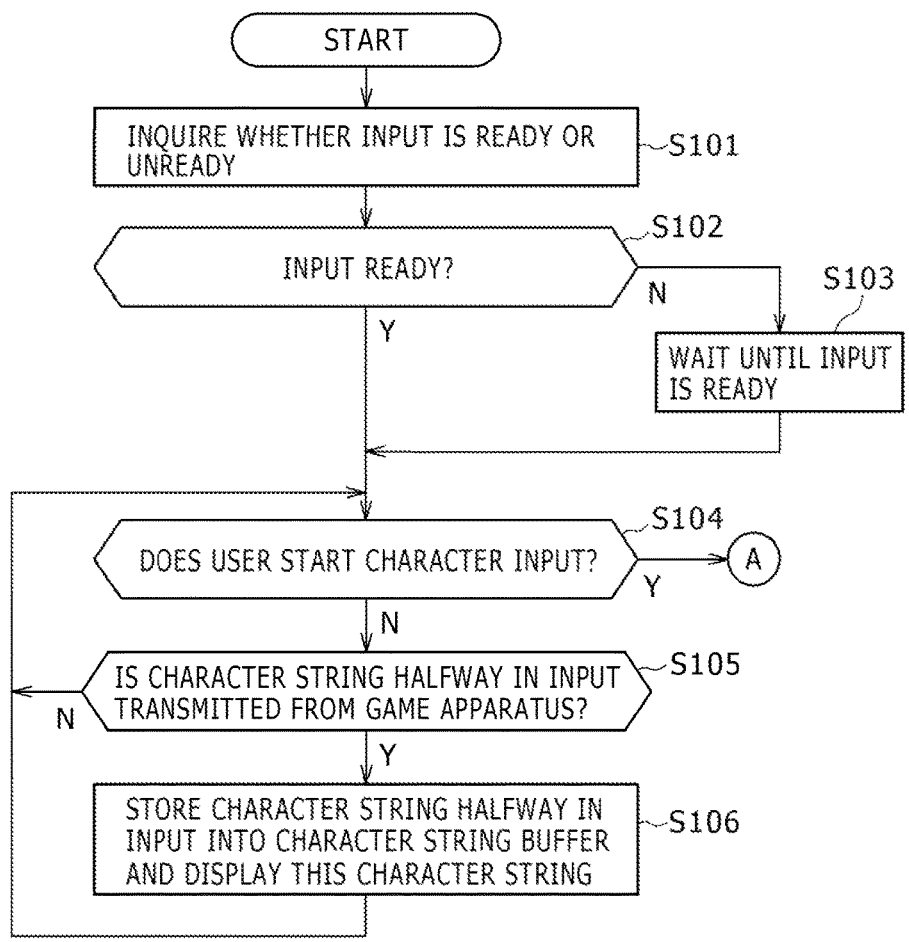
FIG. 9 is a diagram illustrating one example of a processing flow of the mobile terminal.
Figure 10:
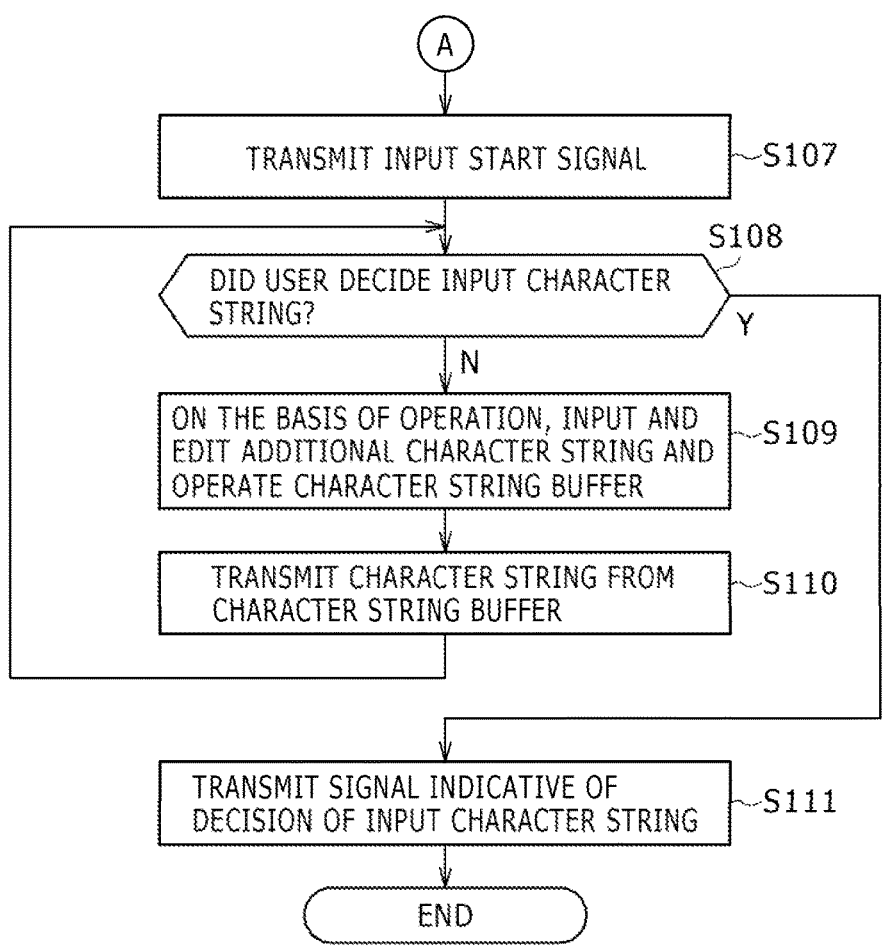
FIG. 10 is a diagram illustrating one example of a processing flow of the mobile apparatus.

Referring to FIGS. 9 and 10, there are shown diagrams illustrating one example of a processing flow of the mobile terminal 1. In what follows, mainly a processing flow of the character string remote input block 53 of the mobile terminal 1 will be described. It should be noted that the flow shown in FIGS. 9 and 10 is executed every time the user starts up remote character string input processing of an application downloaded to the mobile terminal 1 or every time an input character string is decided.

The input ready/unready inquiry block 51 is realized mainly by the processor 11, the storage block 12, and the communication block 13. The input ready/unready inquiry block 51 inquires the game apparatus 2 whether or not the mobile terminal 1 can be put in a state ready for character string input. Also, the input ready/unready inquiry block 51 limits the character string input that uses operations obtained by the touch operation acquisition block 52 until the input of character strings is ready. It should be noted that the input ready/unready inquiry block 51 or the transmission block 54 may transmit the ID of the user authenticated in the remote character string input processing of the mobile terminal 1 to the game apparatus 2.

The input ready/unready inquiry block 51 first inquires the game apparatus 2 whether or not the mobile terminal 1 can be put in a state ready for character string input (step S101). If input unready information is received (character string input is unready) as a response to that inquiry (N of step S102), the input ready/unready inquiry block 51 waits until input ready information is received (input is ready) (step S103). In this state, a message indicative of input wait is displayed on the screen of the mobile terminal 1. On the other hand, if input ready information is received as a response and therefore character string input is ready (Y of step S102), then the flow goes to the next processing of the character string remote input block 53.

The character string remote input block 53 is realized mainly by the processor 11 and the storage block 12. On the basis of an operation obtained by the touch operation acquisition block 52, the character string remote input block 53 gets an additional character string that is inputted in a partial character string transmitted from the game apparatus 2 and, on the basis of the partial character string transmitted from the game apparatus 2, the additional character string, and the operation obtained by the touch operation acquisition block 52, edits and decides the input character string to be passed to the application block 66. Details of this processing will be described below.

After a character string input operation is made ready, the character string remote input block 53 determines whether or not the user starts character string input by use of the mobile terminal 1 on the basis of an operation obtained by the touch operation acquisition block 52 (step S104). The character string remote input block 53 determines whether or not character string input is started by the decision whether or not an operation for inputting the first character has been done; however, it is also practicable to use another method. For example, the character string remote input block 53 may determine whether or not character string input is started by the decision whether or not the remote character string input processing on the side of the mobile terminal 1 has been started up.

If the user has not started character string input (N of step S104), then the character string remote input block 53 gets a character string from the game apparatus 2 and executes processing of displaying the received character string. To be more specific, the character string remote input block 53 checks whether or not a partial character string halfway through input and edit is transmitted from the transmission block 65 of the game apparatus 2 and the reception block 55 receives this partial character string (step S105). If this partial character string is found transmitted (Y of step S105), then the character string remote input block 53 stores the partial character string into the character string buffer 56 and, at the same time, displays this character string in the character string display column 72 on the screen of the mobile terminal 1 (step S106). Then, the processing from step S104 is repeated.

On the other hand, if it is found that the user starts character string input at the mobile terminal 1 in step S104 (Y of step S104), then the transmission block 54 transmits an input start signal indicative of the start of character string input by the user at the mobile terminal 1 to the game apparatus 2 (step S107).

Next, on the basis of an operation obtained by the touch operation acquisition block 52, the character string remote input block 53 decides whether or not the user has determined an input character string (step S108). For example, the character string remote input block 53 may make the above-mentioned decision by whether or not the user has pressed a button indicative of decision of character string input. If it is found that the user has not decided an input character string (N of step S108), the character string remote input block 53 executes, on the basis of that operation, character string operations such as acquisition of an additional character string, kanji conversion, and character string editing (step S109). The results thereof are reflected onto the character string that is stored in the character string buffer 56. Then, the transmission block 54 transmits data of the character string stored in the character string buffer 56 to the reception block 64 of the game apparatus (step S110). Subsequently, the processing from step S108 is repeated again. Thus, the character string remote input block 53 can edit and decide the final input character string (for example, a character string including both of the following partial character string and additional character string) based on the partial character string inputted in the game apparatus 2 and the additional character string inputted by an input device such as the touch panel in the mobile terminal 1.

On the other hand, if it is found that the user has decided a character string to be inputted in an application program (Y of step S108), then the transmission block 65 transmits a decision signal indicative of the decision of a character string input to the reception block 64 of the game apparatus 2 (step S111). The character string stored in the character string buffer 56 at the time of this decision is an input character string to be passed to the application block 66. It should be noted that the transmission block 65 may transmit the decided input character string to the reception block 64 of the game apparatus 2 along with the decision signal. If an operation for terminating the remote character string input processing is executed by pressing the close button 73 for example, then the transmission block 54 may transmit a remote input termination signal indicative of termination thereof to the game apparatus 2.

It should be noted that if the reception block 55 receives, from the game apparatus 2, a signal indicative that the ID of the user authenticated by the mobile terminal 1 as a response to input ready/unready inquiry information for example is different from the ID of the user operating the controller 3 after being authenticated in the game apparatus 2, the character string remote input block 53 may restrict the input of a character string. At that moment, the mobile terminal 1 may output and display a message indicative that the ID of the user associated with the mobile terminal 1 is different from the ID of the user associated with the game apparatus 2 or associated with the startup of character input processing, thereby terminating the remote character string input processing.

Figure 11:
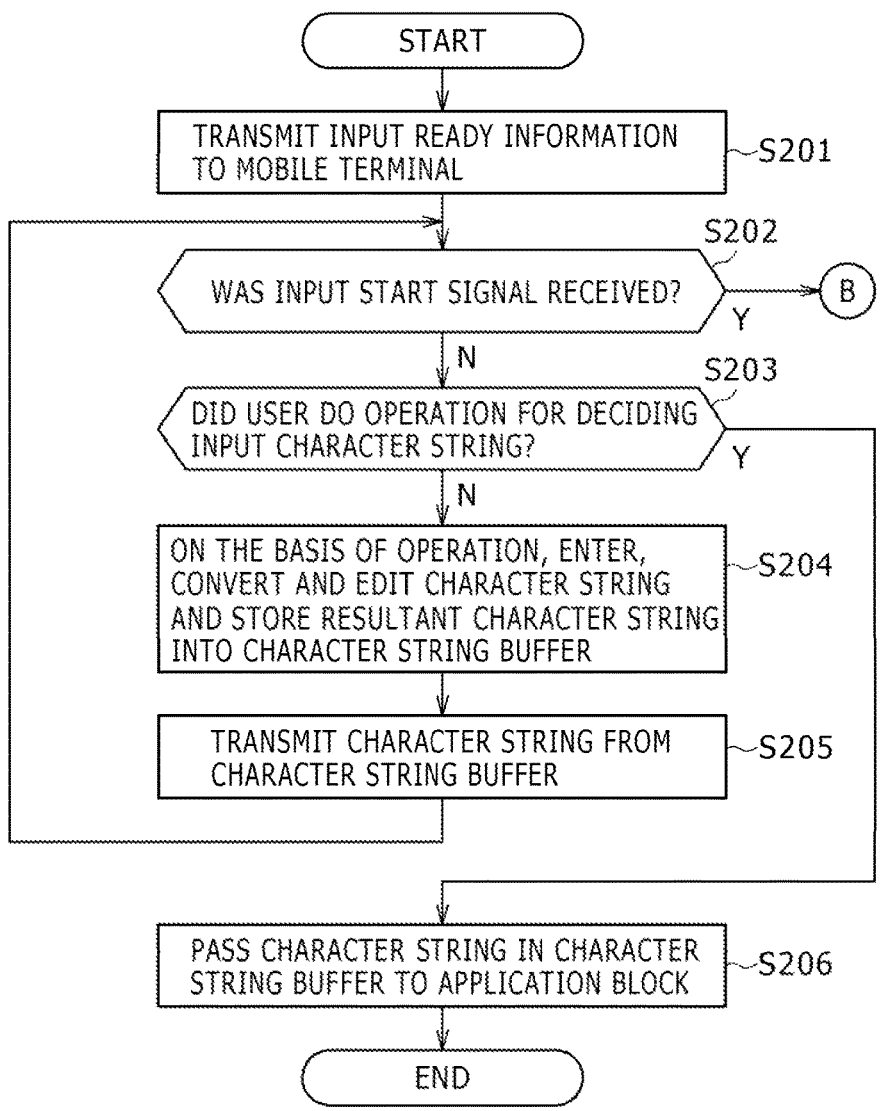
FIG. 11 is a diagram illustrating one example of a processing flow of the game apparatus.
Figure 12:
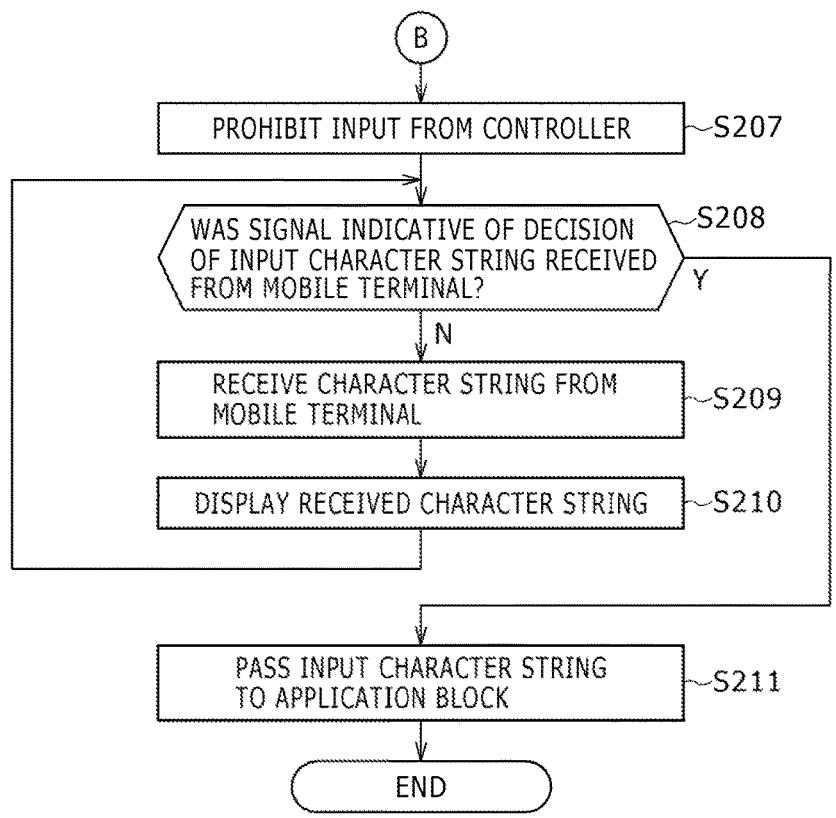
FIG. 12 is a diagram illustrating one example of a processing flow of the game apparatus.

Next, a processing flow of mainly the character string input block 62 and the character string output block 63 of the game apparatus 2 will be described. FIGS. 11 and 12 are diagrams illustrating one example of a processing flow of the game apparatus 2. The flow shown in FIGS. 11 and 12 is executed every time the application block 66 starts up character string input processing.

First, when a program of character string input is started up by the application block 66 in the game apparatus 2, the transmission block 65 transmits input ready information indicative that character string input is ready to the mobile terminal 1 (Step S201).

It should be noted that, if the user authentication block 68 of the game apparatus 2 decided that the ID of the user authenticated by the user authentication block 57 of the mobile terminal 1 is different from the ID of the user who was authenticated by the user authentication block 68 of the game apparatus 2 and started up this character string input processing (by use of the controller 3 used for character string input), then the transmission block 65 may transmit a signal indicative of an error that the user is wrong without transmitting input ready information, thereby restricting the input of character strings from the mobile terminal 1.

The character string input block 62 is realized mainly by the processor 21 and the storage block 22. In step S201, the character string input block 62 checks whether an input start signal has been received from the mobile terminal 1 (step S202). Here, an input start signal is received by the reception block 64 from time to time.

If no input start signal is found received (N of step S202), then, on the basis of the operation obtained by the controller operation acquisition block 61, the character string input block 62 decides whether the user has executed an operation for completing the input of character string (step S203). A method of this decision may be the decision whether a button indicative of the completion of character string input has been pressed by the user. If it is found that the user has not executed the operation for the completion of character string input (N of step S203), then, on the basis of this operation, the character string input block 62 executes character string operations such as acquisition of character string, kanji conversion, and character string editing, the results thereof being reflected onto the character string stored in the character string buffer 67 (step S204). Then, the transmission block 65 transmits data of the operated character string stored in the character string buffer 67 to the reception block 55 of the mobile terminal 1 (step S205). Subsequently, the processing from step S202 is repeated.

The character string output block 63 is realized mainly by the processor 21 and the storage block 22. The character string output block 63 passes an input character string edited by the character string input block 62 and the character string remote input block 53 and decided to be inputted in the application block 66 to the application block 66.

If the user executes an operation for deciding an input character string in step S203 (Y of step S203), the character string output block 63 passes the character string inputted and stored in the character string buffer 67 so far to the application block 66 (step S206), thereby terminating the character string input processing. At this moment, the transmission block 65 may transmit input unready information to the mobile terminal 1. When the reception block 55 of the mobile terminal 1 receives this input unready information, the character string remote input block 53 displays that character string input is in the wait state, thereby prohibiting input.

If the input start signal was received in step S202 (Y of step S202), then the character string input block 62 prohibits the execution of input of a character string on the basis of an operation obtained by the controller operation acquisition block 61 (step S207). To be more specific, the character string input block 62 prohibits the input by disabling the pressing of the buttons of the on-screen keyboard, for example.

Subsequently, until the reception block 64 receives the decision signal from the mobile terminal 1 (Y of step S208), the character string output block 63 repeats reception of the character string transmitted from the transmission block 54 of the mobile terminal 1 (step S209) and the character string output block 63 repeats the display of the received character string in the character string display column 71 of the screen (step S210). Then, when the reception block 64 receives the decision signal from the mobile terminal 1 (Y of step S209), the character string output block 63 passes the input character string stored in the character string buffer 67 to the application block 66 (step S211).

It should be noted that if the reception block 64 receives a remote input termination signal indicative of termination of remote character string input processing rather than a decision signal from the transmission block 54 of the mobile terminal 1 or if communication between the mobile terminal 1 and the game apparatus 2 is discontinued for some reason, then the character string input block 62 may cancel the inhibition of the character input by the controller 3. In this case, the character string input block 62 may put the on-screen keyboard into the input ready state again, thereby restarting the processing from step S203.

Thus, the processing in which characters are first inputted by the controller 3 and then a character string is added or edited at the mobile terminal 1 is realized. Although there is no processing for deciding and solving the input contention between the mobile terminal 1 and the game apparatus 2, the input of the controller 3 and the input of the mobile terminal 1 can be mixed without damaging substantial convenience.

Further, restricting input by use of the touch panel of the mobile terminal 1 if the ID of the user who starts up remote character string input processing of the mobile terminal 1 is different from the ID of the user who starts up character string input processing of the game apparatus 2 allows the prevention of two or more users from inputting character strings at the same time. This also allows a simple method to prevent the occurrence of input contentions in advance.

It should be noted that the present invention is applied not only to the mobile terminal 1 and the game apparatus 2. For example, the present invention may be applied to devices with which character strings are inputted through a remote controller like a household video recorder instead of the game apparatus 2.

Second Embodiment

Figure 13:
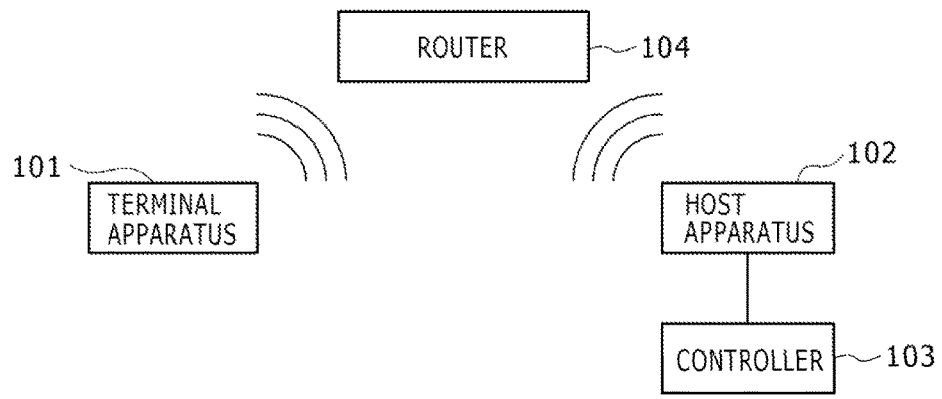
FIG. 13 is a diagram illustrating one example of an information processing system practiced as a second embodiment.

Referring to FIG. 13, there is shown a diagram illustrating one example of an information processing system practiced as the second embodiment. The information processing system practiced as the second embodiment has a terminal apparatus 101, a host apparatus 102, a controller 103, and a router 104, for example. For example, the terminal apparatus 101 is a mobile computer such as a mobile game machine, the host apparatus 102 is a stationary game machine, and the controller 103 is a game controller. The controller 103 is directly connected to the host apparatus 102 in a wired or wireless manner. The terminal apparatus 101 may be a tablet terminal or a stationary computer. The host apparatus 102 may be a mobile terminal.

The terminal apparatus 101 and the host apparatus 102 are interconnected via a network. The terminal apparatus 101 and the host apparatus 102 are interconnected by a LAN that includes the router 4 in FIG. 13; this connection may also be via the Internet.

With the present embodiment, description will be mainly made in the case in which the host apparatus 102 is remotely operated by use of the terminal apparatus 101 and characters are inputted from the terminal apparatus 101. In a remote operation, the host apparatus 102 transmits image data of an image drawn by itself to the terminal apparatus 101, and the terminal apparatus 101 displays the received image on a display output device of the terminal apparatus 101, thereby presenting the image to the user. In addition, the terminal apparatus 101 gets an input from a user and transmits the obtained input to the host apparatus 102. The transmitted input is used for processing of the host apparatus 102. In the following description, the terminal apparatus 101 is a mobile game machine and the host apparatus 102 is stationary game machine.

Figure 14:
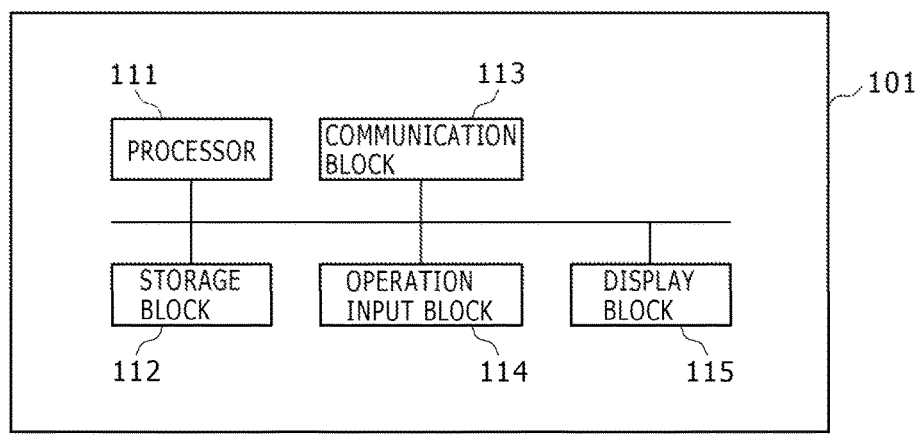
FIG. 14 is a diagram illustrating one example of a hardware configuration of a terminal apparatus.

Referring to FIG. 14, there is shown a diagram illustrating one example of a hardware configuration of the terminal apparatus 101. The terminal apparatus 101 has a processor 111, a storage block 112, a communication block 113, an operation input block 114, and a display block 115. The processor 111, the storage block 112, the communication block 113, and the display block 115 are the same as the processor 11, the storage block 12, the communication block 13, and the display block 15 of the first embodiment, so that the description will be skipped.

The operation input block 114 is an input device such as a touch panel or buttons and sticks of a controller, for example. On the basis of control by the processor 111, the operation input block 114 detects a position touched by a user, a direction inputted in the controller, and pressing of a particular button. The touch panel is arranged so as to be superimposed on the display area of the display block 115. It should be noted that the operation input block 114 and the display block 115 of the terminal apparatus 101 may not include an input device and an image output device themselves; instead, an external input device and an external display output device may be controlled. It should also be noted that the hardware configuration of the host apparatus 102 is the same as that of the game apparatus 2, so that the description will be skipped.

Figure 15:
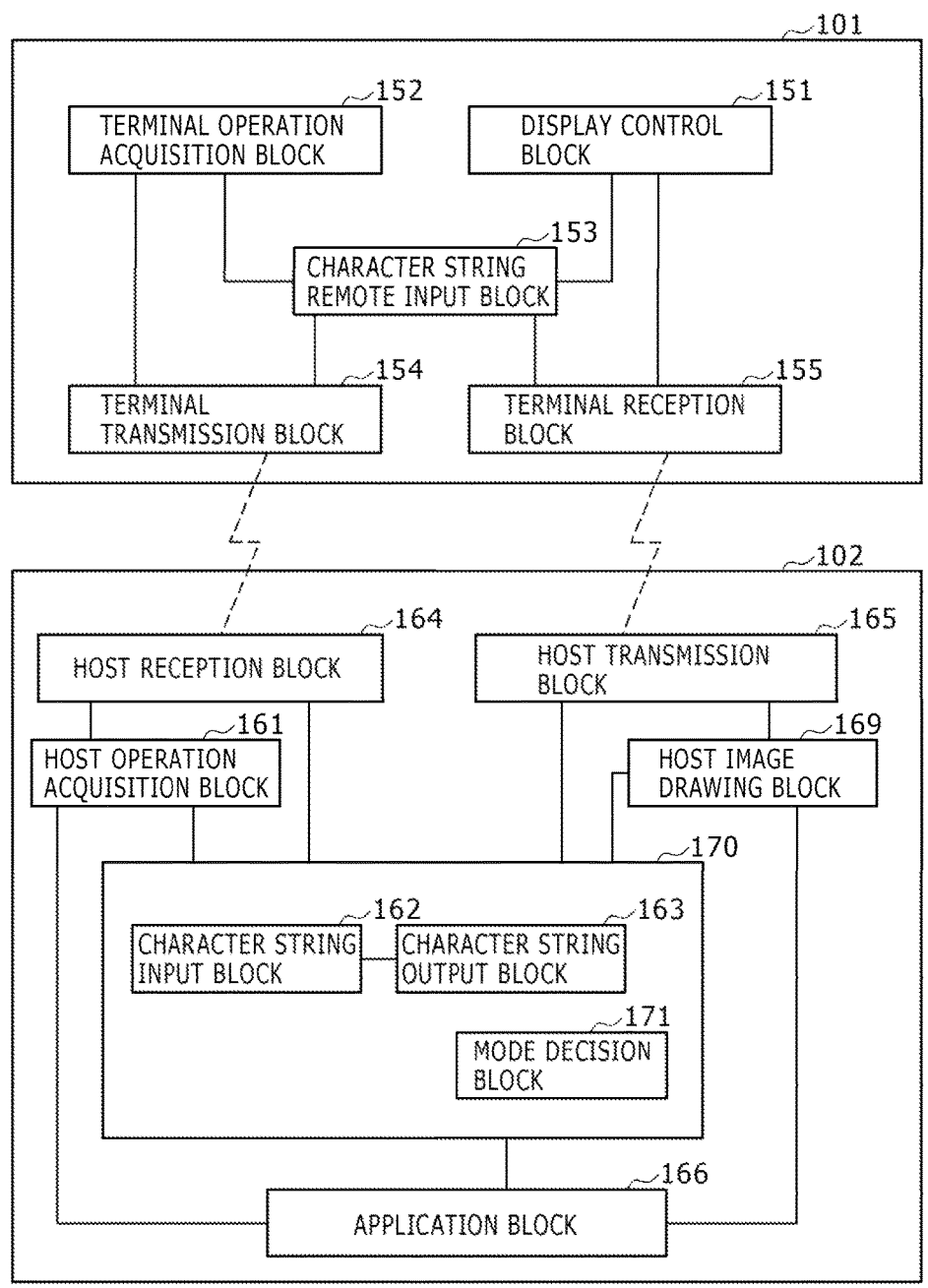
FIG. 15 is a block diagram illustrating functions that are realized by the information processing system practiced as the second embodiment.

Referring to FIG. 15, there is shown a block diagram illustrating functions that are realized by the information processing system practiced as the second embodiment. The terminal apparatus 101 related with this embodiment functionally has a display control block 151, a terminal operation acquisition block 152, a character string remote input block 153, a terminal transmission block 154, and a terminal reception block 155. These functions are realized by the processor 111 included in the terminal apparatus 101 that executes programs stored in the storage block 112 to control the communication block 113, the operation input block 114, and display block 115.

The host apparatus 102 functionally has a host operation acquisition block 161, a character string input block 162, a character string output block 163, a host reception block 164, a host transmission block 165, an application block 166, a host image drawing block 169, and a character string decision unit 170. These functions are realized by the processor 21 included in the host apparatus 102 by executing programs stored in the storage block 22 to control the communication block 23 and the input/output block 24. The character string decision unit 170 has the character string input block 162, the character string output block 163, a mode decision block 171.

The application block 166 is realized mainly by the processor 21 and the storage block 22. The application block 166 is equivalent to the application block 66 in the first embodiment and is a process of a messaging application that requires character string input, for example.

The character string decision unit 170 is realized mainly by the processor 21 and the storage block 22. The mode decision block 171 included in the character string decision unit 170 decides whether or not to start character input with a request from the application block 166 or a user operation used as a trigger. Then, if character input is decided to start, the mode decision block 171 makes the host transmission block 165 transmit a start request and, at the same time, host image drawing block 169 display an image for character string input (an image for the user to identify an input character). The image for character string input is a screen keyboard 191 for example. It should be noted that the mode decision block 171 need not always make the host image drawing block 169 display a character string input image. It should also be noted that the character string input block 162 and the character string output block 163 included in the character string decision unit 170 execute character string input processing to be described later. Here, the user who operates the application block 166 and the character string decision unit 170 of the host apparatus 102 is not only a user who executes an input operation in the terminal apparatus 101, but also a user who operates the controller 103 and the like connected to the host apparatus 102. In this case, as with the user authentication blocks 57 and 68 in the first embodiment, an operating user may be authenticated in advance.

The host image drawing block 169 is realized mainly by the processor 21 and the storage block 22. On the basis of instructions from the application block 166 and the character string decision unit 170, the host image drawing block 169 draws an image (a host image) in the host apparatus 102. Then, if connected to the terminal apparatus 101 for remote operation, the host image drawing block 169 outputs image data indicative of the host image to the host transmission block 165. If a display output device is connected to the host apparatus 102 and is ready for outputting a host image, then host image drawing block 169 controls the display output device to display the host image.

Figure 16:
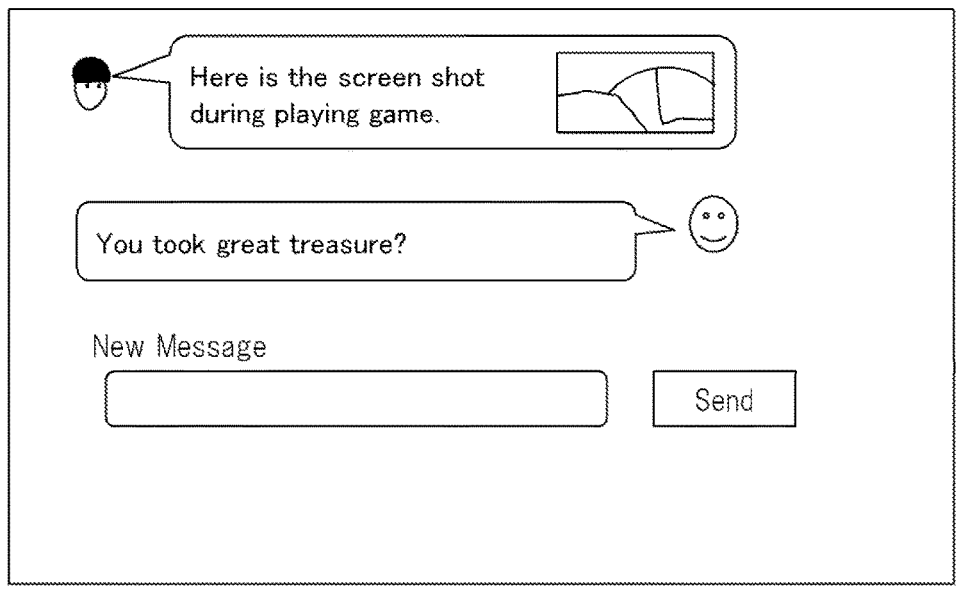
FIG. 16 is a diagram illustrating one example of an image drawn by a host apparatus.

Referring to FIG. 16, there is shown a diagram illustrating one example of an image drawn by the host apparatus 102. This diagram is an example of an image in an application with which users pass messages to each other and is an image before a user starts character input.

Figure 17:
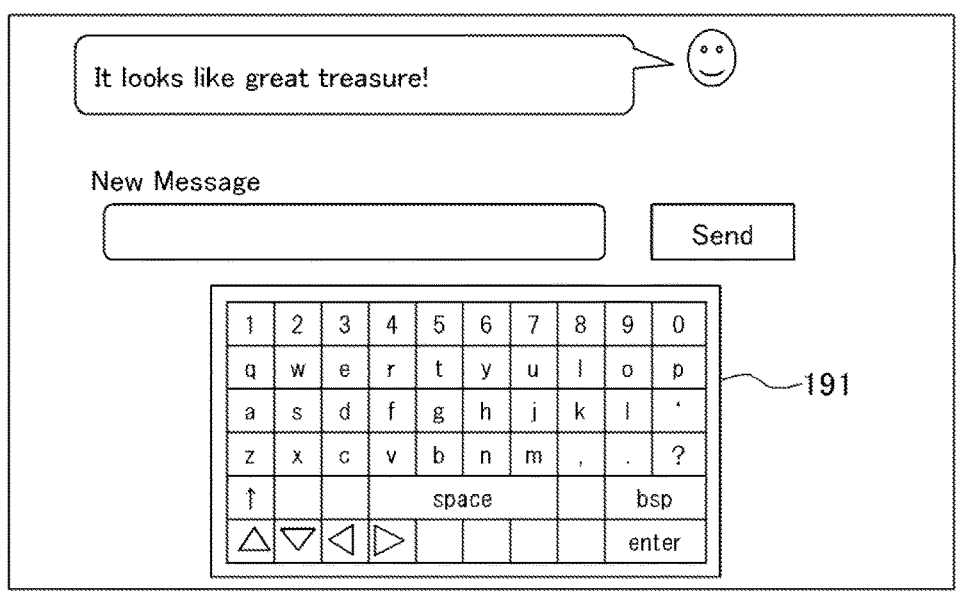
FIG. 17 is a diagram illustrating one example of a host image that is displayed at the time of character input.

Referring to FIG. 17, there is shown a diagram illustrating one example of a host image that is displayed in character input. This diagram is an example of a host image in which the host image drawing block 169 drew an image of the screen keyboard 191 for character input as superimposed on the screen of an application. The screen keyboard 191 is drawn at the center of the lower half of the host image and arranged with buttons for identifying alphabets, numbers, and symbols, a shift button for switching between button types, a cursor button, a backspace button (bsp), and a button (Enter) indicative of input completion. The indication of the input completion button may be switched to "Send" or "Search" depending on the type of character string input column.

The host transmission block 165 is realized mainly by the processor 21, the storage block 22, and the communication block 23. The host transmission block 165 transmits image data generated by the host image drawing block 169 to the terminal reception block 155 repeatedly at intervals according to the band of a network. In addition, the host transmission block 165 transmits a start request to the terminal reception block 155 when so instructed by the abovementioned mode decision block 171. The host transmission block 165 may transmit a text of an item to be displayed on a button indicative of input completion.

The terminal reception block 155 is realized mainly by the processor 111, the storage block 112, and the communication block 113. The terminal reception block 155 receives data transmitted from the host transmission block 165.

The display control block 151 is realized mainly by the processor 111, the storage block 112, and the display block 115. On the basis of image data of a host image received by the terminal reception block 155, the display control block 151 outputs the host image to a display output device. In addition, if the terminal reception block 155 receives a start request indicative of a request for starting character input from the host apparatus 102, the display control block 151 also outputs an image (hereafter referred to as "character identification image") for allowing the user to identify characters at the time of character input. The character identification image is a screen keyboard 181 for example; the character identification image may also be a handwritten character input area.

In addition, every time image data is received before the reception of the start request, the display control block 151 has display means display a host image indicated by the image data. Until the input of a character string is completed after the reception of the start request, the display control block 151 has the display means display an image different from the host image but including a character identification image. The image that is different from the host image and includes a character identification image is an image created by superimposing the host image and the character identification image with each other. It should be noted that the image that is different from the host image and includes a character identification image may not include the host image at all.

Figure 18:
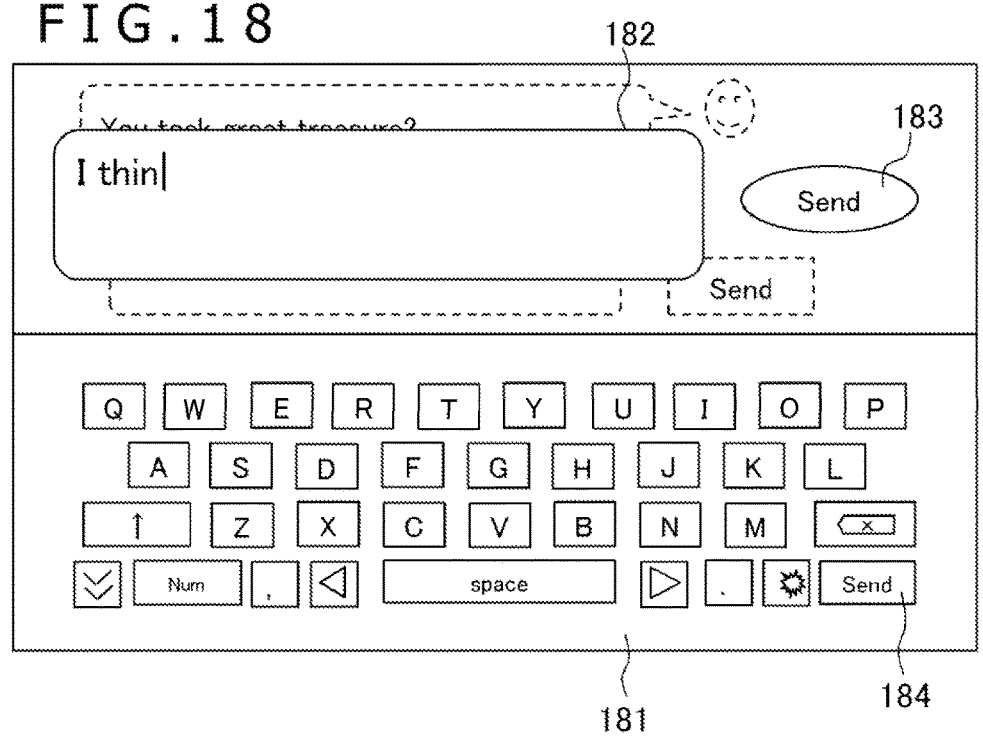
FIG. 18 is a diagram illustrating one example of an image drawn by a terminal apparatus at the time of character input.

Referring to FIG. 18, there is shown a diagram illustrating one example of an image drawn by the terminal apparatus 101 at the time of character input. In the example of this diagram, the display control block 151 displays the screen keyboard 181, a character string display column 182 halfway through input, and a transmission button 183 as superimposed on a host image as a character identification image on the host image. In addition, in areas other than the area in which the character identification image is superimposed, the host image is displayed in a half transparent manner. The screen keyboard 181 is drawn in the lower half of the screen and arranged with buttons for identifying alphabets and symbols, a shift button for switching between button types such as numbers and other symbols, a cursor button, a backspace button, and an input completion button 184 indicative of completion of input. The display control block 151 displays such that the area for displaying the screen keyboard 181 covers the screen keyboard 191 of the host image. In the example shown in FIG. 18, the display control block 151 displays "Send" that is a text received from the host apparatus 102 onto the input completion button 184. The input completion button 184 and the transmission button 183 are both handled as buttons indicative of completion of input.

The terminal operation acquisition block 152 is realized mainly by the processor 111, the storage block 112, and the operation input block 114. The terminal operation acquisition block 152 gets an operation done by the user through an input device and outputs operation data indicative of coordinates and directions identified by this operation and any option done by this operation to the terminal transmission block 154 or the character string remote input block 153. If the screen keyboard 181 is drawn, the terminal operation acquisition block 152 outputs operation data to the character string remote input block 153 and, if the screen keyboard 181 is not drawn, outputs operation data to the terminal transmission block 154.

The character string remote input block 153 is realized mainly by the processor 111 and the storage block 112. On the basis of operation data indicative of an operation by the user on a character identification image, the character string remote input block 153 generates character data indicative of a character identified by the user. The character data is text data of a character string including the identified character for example; the character data may also be data indicative of type or position of a pressed button among buttons of the screen keyboard 181 or data of coordinates at which touch was done. In the following description, the character data is assumed to be text data including this identified character. In addition, on the basis of a user operation, the character string remote input block 153 decides whether or not the input of a character string by the above-mentioned user has been terminated; if the input is found terminated, the character string remote input block 153 makes the terminal transmission block 154 transmit a termination request along with the character data.

The terminal transmission block 154 is realized mainly by the processor 111, the storage block 112, and the communication block 113. The terminal transmission block 154 transmits operation data or character data generated by the character string remote input block 153 to the host apparatus 102. The terminal transmission block 154 transmits a termination request and the like on the basis of control by the character string remote input block 153.

The host reception block 164 is realized mainly by the processor 21, the storage block 22, and the communication block 23. The host reception block 164 gets data transmitted from the terminal transmission block 154.

The host operation acquisition block 161 is realized mainly by the processor 21, the storage block 22, and the input/output block 24. The host operation acquisition block 161 gets operation data indicative of an operation (coordinates, directions, or presence or absence of button input) inputted in an input device directly connected to the host apparatus 102 such as the controller 103. The host operation acquisition block 161 also gets operation data acquired by the terminal operation acquisition block 152. The host operation acquisition block 161 outputs the operation data obtained from the input device or the terminal operation acquisition block 152 to the application block 166 or the character string decision unit 170. To be more specific, if the operation data is for the area of the screen keyboard 191, then the host operation acquisition block 161 outputs the operation data to the character string decision unit 170; if the operation data is for areas other than the area of the screen keyboard 191, the host operation acquisition block 161 outputs the operation data to the application block 166.

The character string input block 162 included in the character string decision unit 170 decides a character string inputted by the user on the basis of the operation data inputted from the host operation acquisition block 161. Further, the character string decision unit 170 decides the character string of the character data received by the host reception block 164 as the character string inputted by the user. Then, the character string output block 163 included in the character string decision unit 170 passes the decided character string to the application block 166.

If a termination request is received by the host reception block 164, the mode decision block 171 included in the character string decision unit 170 instructs the host image drawing block 169 to delete the image for character string input from the host image. Consequently, upon reception of a termination request, the host transmission block 165 transmits image data of an image that does not include the image for character input.

The following describes details of the processing associated with character string input. On the basis of an instruction from the application block 166 or other blocks, the mode decision block 171 decides whether it is an interval between start and end of character input, thereby switching between the character input mode corresponding to the interval between start and end of character input and the positional direction input mode corresponding to other intervals. Referring to FIG. 19, there is shown a diagram illustrating one example of a processing flow of the character string decision unit 170 associated with the start and end of character string input. This processing is regularly repeatedly executed, for example.

First, the mode decision block 171 decides whether the character input mode is on at the time of execution of this processing (step S601). If the character input mode is found not on (N of step S601), then the mode decision block 171 decides whether a character input is requested by the application block 166 or the character input start button is pressed by the user (step S602). Character input is requested by the application block 166 when column "New Message" is selected on the screen shown in FIG. 16 for example. The character input start button is displayed on the host image by the host image drawing block 169 on the basis of an instruction from the application block 166 or the like (not displayed in FIG. 17).

If the character input is found requested from the application block 166 or character input start button is pressed by the user (Y of step S602), then the mode decision block 171 switches to the character input mode (step S603). In addition, the host transmission block 165 transmits a start request to the terminal reception block 155 (step S604) and the host image drawing block 169 draws the screen keyboard 191 (step S605), thereby making the host transmission block 165 transmit the image data of this drawn host image. On the other hand, if the character input is fount not requested from the application block 166 and the character input start button is found not pressed by the user (N of step S602), then the processing from step S603 to step S605 is skipped.

If the character input mode is not on in step S601 (N of step S601), then it is decided whether an operation for terminating character input has been done by the user or a termination request has been received from the terminal apparatus 101 (step S606). If the operation for terminating character input is found done by the user or a termination request is found received from the terminal apparatus 101 (Y of step S606), then the mode decision block 171 switches to the positional direction input mode (step S608) and the host image drawing block 169 deletes the screen keyboard 191 from the host image (step S608). Consequently, the host transmission block 165 transmits the image data of the host image that does not include the screen keyboard 191. It should be noted that, if the operation for terminating character input is not done by the user and a termination request is not received from the terminal apparatus 101 (N of step S606), then step S607 and step S608 are skipped.

Figure 20:
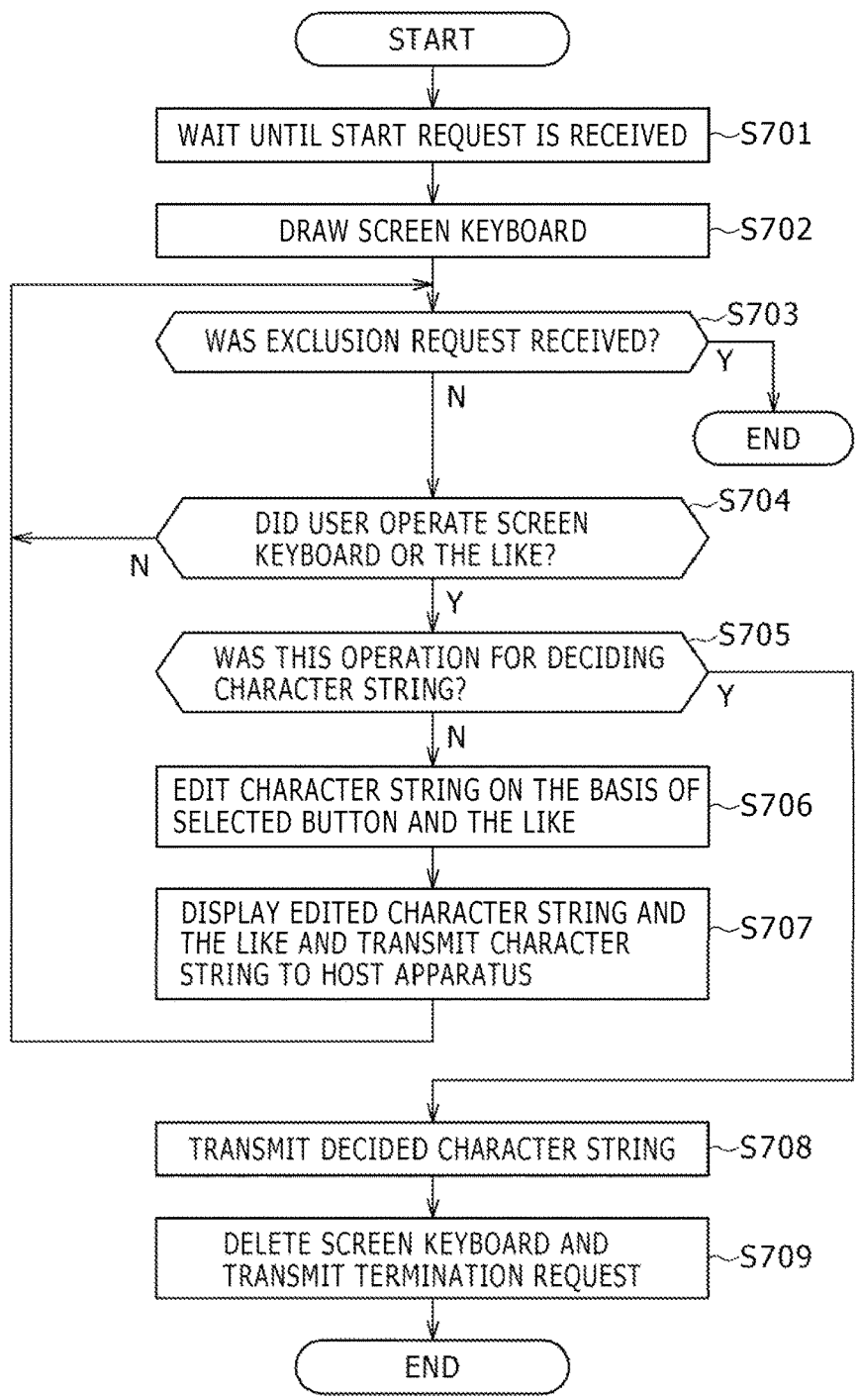
FIG. 20 is a diagram illustrating one example of a processing flow of the terminal apparatus at the time of character input.

Referring to FIG. 20, there is shown a diagram illustrating one example of a processing flow of the terminal apparatus 101 at the time of character input. First, the character string remote input block 153 waits until the terminal reception block 155 receives a start request (step S701). Upon reception of a start request, the display control block 151 draws the screen keyboard 181 as instructed by the character string remote input block 153 (step S702). The display control block 151 executes control such that display means displays an image (refer to FIG. 18) with the screen keyboard 181 superimposed on the host image.

Then, if an exclusion request is received by the terminal reception block 155 (Y of step S703), the display control block 151 deletes the screen keyboard 181, thereby terminating the processing related with character input. An exclusion request is used for exclusive processing for deciding which of the terminal apparatus 101 and the controller 103 connected to the host apparatus 102 is used as the device for character input.

On the other hand, if no exclusion request is received by the terminal reception block 155 (N of step S703), then, on the basis of the operation data from the terminal operation acquisition block 152, it is decided whether the user has operated the screen keyboard 181 drawn by the display control block 151 (step S704). If it is found that the user has not operated the screen keyboard 181 (N of step S704), then the subsequent processing is skipped and the processing from the step S703 is repeated. On the other hand, if it is found that the user has operated the screen keyboard 181 in step S704 (Y of step S704), then the character string remote input block 153 decides whether this operation is an operation for determining a character string (an operation for completing character input) (step S705). The operation for determining a character string is an operation for pressing the transmission button 183 or the input completion button 184 as shown in FIG. 18 for example.

If the operation is found not for determining a character string (N of step S705), then the operation is for the selection of a character button like alphabet or number or the selection of a edit button like backspace, so that the character string remote input block 153 edits a character string on the basis of the selected button (step S706). Then the character string remote input block 153 instructs the display control block 151 to display the edited character string and the terminal transmission block 154 to transmit the data (the character data including the character identified by the user) of the character string halfway through editing (step S707). It should be noted that the display control block 151 makes display means display an image with the character string edited on the basis of the above-mentioned instruction drawn in the character string display column 182.

On the other hand, if the operation is found to be an operation for determining a character string in step S705 (Y of step S705), then the character string remote input block 153 determines the character string being inputted at the current point of time as a character string to be inputted in the application block 166 and the terminal transmission block 154 transmits this determined character string (step S708). Further, the display control block 151 deletes the screen keyboard 181 and the terminal transmission block 154 transmits a termination request indicative of the completion of character string input (step S709).

Figure 21:
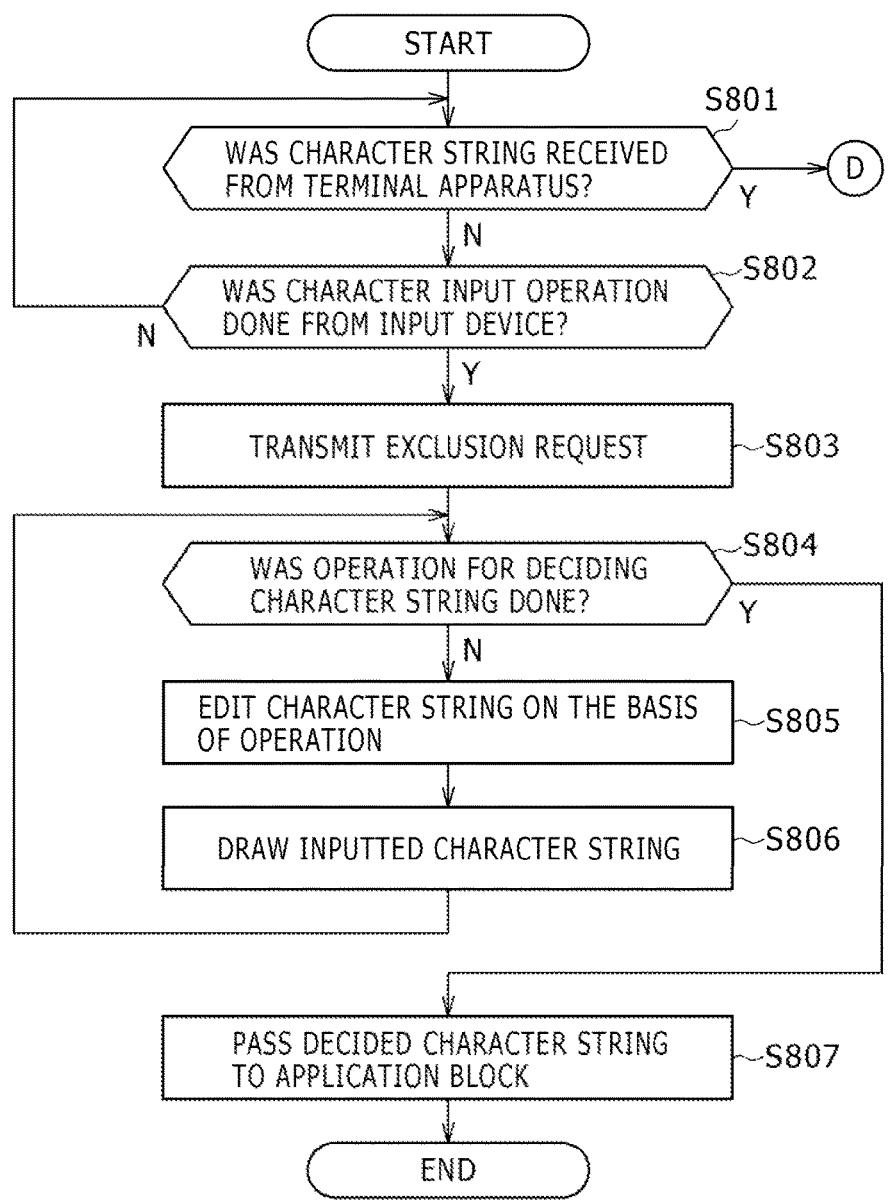
FIG. 21 is a diagram illustrating one example of a processing flow of the host apparatus at the time of character input.
Figure 22:
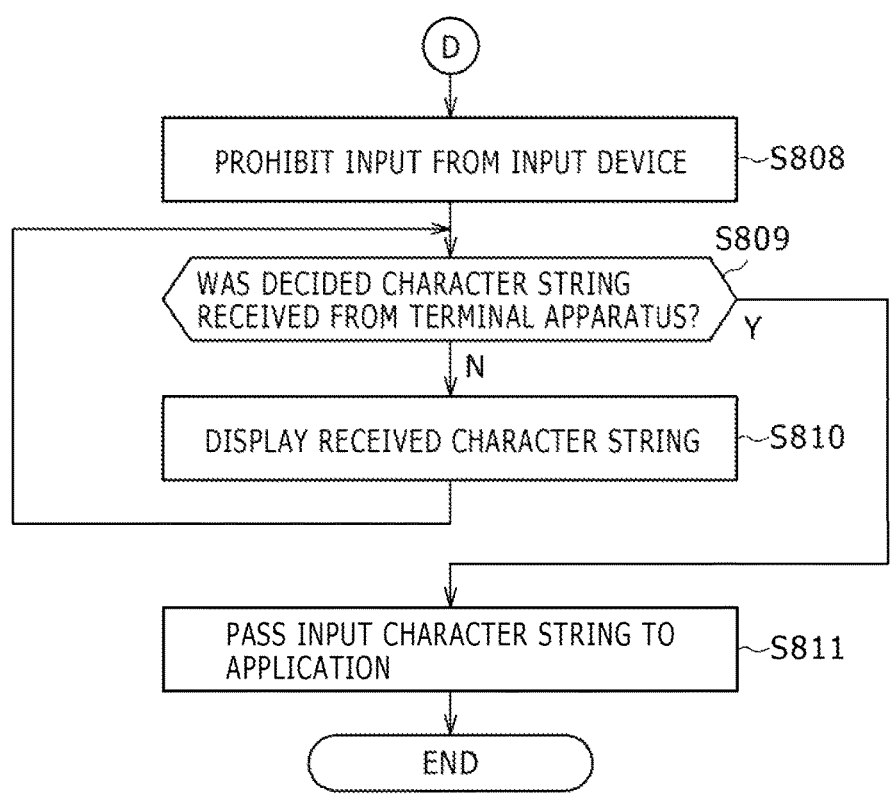
FIG. 22 is a diagram illustrating one example of a processing flow of the host apparatus at the time of character input.

Referring to FIGS. 21 and 22, there are shown diagrams illustrating one example of a processing flow of the host apparatus 102 at the time of character string input. First, the character string input block 162 decides whether the host reception block 164 has received a character string halfway through editing from the terminal transmission block 154 of the terminal apparatus 101 (step S801). If a character string halfway through editing is found received from the terminal transmission block 154 (Y of step S801), then the input from an input device directly connected to the host apparatus 102 such as the controller 103 is prohibited (step S808). The processing of step S808 is exclusive processing that prioritizes the input on the side of the terminal apparatus 101. If the determined character string has not been received from the terminal transmission block 154 of the terminal apparatus 101 (N of step S809), then the character string halfway through editing received by the host image drawing block 169 is drawn (step S810) and the processing is repeated from step S809 again. On the other hand, if the determined character string has been received from the terminal transmission block 154 of the terminal apparatus 101 in step S809 (Y of step S809), then the character string output block 163 passes the determined character string to the application (step S811) and notifies the mode decision block 171 that the user has executed an operation of character input termination. Consequently, the processing of character string input comes to an end, upon which the host image drawing block 169 deletes the screen keyboard 191.

On the other hand, if the character string halfway through editing is not found received from the terminal apparatus 101 in step S801 (N in step S801), then, on the basis of the operation data inputted from the host operation acquisition block 161, the character string input block 162 decides whether or not an operation for character input by use of the controller 103 has been done (step S802). If no operation for character input is found done (N of step S802), then the processing is repeated from step S801. On the other hand, if the operation for character input is found done (Y of step S802), then the character string input block 162 instructs the host reception block 164 to transmit an exclusion request, upon which the host transmission block 165 transmits the exclusion request (step S803). Consequently, the input from the controller 103 is subsequently prioritized.

Next, on the basis of the input from the input device, the character string input block 162 decides whether or not an operation for deciding a character string has been done by the user. If the operation for deciding a character string is found not done (N of step S804), then the character string is edited on the basis of the inputted operation (step S805). Then, the character string input block 162 instructs the host image drawing block 169 to draw the inputted character string, upon which the host image drawing block 169 draws the inputted character string (step S806). On the other hand, if the operation for deciding a character string is found done (Y of step S804), then the character string output block 163 passes the decided character string to the application block 166 (step S166), thereby notifying the mode decision block 171 that the user has done the operation for character input termination. Consequently, the processing of character string input comes to an end.

The processing described above makes an interval between start and end of display of the screen keyboard 181 by the terminal apparatus 101 correspond to an interval between start and end of character string input. Consequently, a character identification image such as the screen keyboard 181 is not displayed on the display means of the terminal apparatus 101 during the interval in which character string input is not executed, thereby reducing the chances causing hindrance for the user to view host images. In addition, because, in character input, realtime operations for output of host images are seldom required, the degree of suppression of the possibility in which the user feels hampered is expected to be greater than the reduction of screen interval.

It should be noted that, in the examples shown in FIGS. 20 through 22, exclusion processing is executed in which input through the terminal apparatus 101 or input through the controller 103, whichever is done first, is prioritized at the time of character string input; however, it is also practicable to execute exclusion control such that only the user specified by the application block 166 (the user who selected the character input column, for example) is able to input character strings from the beginning. Alternatively, as with shown in FIG. 9 through FIG. 12 of the first embodiment, the character string input from the controller 103 may be allowed until input through the terminal apparatus 101 is done.

REFERENCE SIGNS LIST

1 Mobile terminal, 2 Game apparatus, 3 Controller, 4 Router, 11, 21, 111 Processor, 12, 22, 112 Storage block, 13, 23, 113 Communication block, 14 Touch recognition block, 15, 115 Display block, 24 Input/output block, 51 Input ready/unready inquiry block, 52 Touch operation acquisition block, 53 Character string remote input block, 54 Transmission block, 55 Reception block, 56, 67 Character string buffer, 57, 68 User authentication block, 61 Controller operation acquisition block, 62 Character string input block, 63 Character string output block, 64 Reception block, 65 Transmission block, 66 Application block, 71, 72 Character string display column, 73 Close button, 101 Terminal apparatus, 102 Host apparatus, 103 Controller, 104 Router, 114 Operation input block, 151 Display control block, 152 Terminal operation acquisition block, 153 Character string remote input block, 154 Terminal transmission block, 155 Terminal reception block, 161 Host operation acquisition block, 162 Character string input block, 163 Character string output block, 164 Host reception block, 165 Host transmission block, 166 Application block, 169 Host image drawing block, 170 Character string decision unit, 171 Mode decision block, 181, 191 Screen keyboard, 182 Character string display column, 183 Transmission button, 184 Input completion button

The invention claimed is:
1. A character input system comprising:
a first information processing apparatus comprising:
 a first operation acquisition block configured to acquire a first operation done on a first input device from a user;
 a character string acquisition block configured to acquire a first character string on a basis of the acquired first operation,
 wherein the first character string is displayed on a first display of the first information processing apparatus; and a character string output block configured to transmit an input character string to an application program; and a second information processing apparatus comprising:
 a second operation acquisition block configured to acquire a second operation done on a second input device from the user; and
 a character string input block configured to acquire a second character string on a basis of the acquired second operation,
 wherein the second character string is displayed on a second display of the second information processing apparatus; and
 wherein the first character string is also displayed on the second display if the first character string was acquired before the second character string, and
 wherein the second character string is also displayed on the first display if the second character string was acquired before the first character string;
the character string output block transmits the input character string as a single output to the application program after receiving an instruction from the user, wherein the input character string is a combination of the first character string and the second character string.

2. The character input system according to claim 1,
wherein the second information processing apparatus further comprises:
a transmission block configured to transmit a signal indicative that input of the second character string by use of the second input device is started by the user,
the first information processing apparatus further comprises;
a reception block configured to receive the signal transmitted from the second information processing apparatus, and
if the signal is received, the character string acquisition block restricts input of the first character string by use of the first input device.

3. The character input system according to claim 1,
wherein the first information processing apparatus further comprises:
a transmission block configured to transmit the first character string acquired by the character string acquisition block,
the second information processing apparatus further comprises:
a reception block configured to receive the transmitted first character string,
the character string output block decides whether to include the first character string in the input character string that is transmitted to the application program.

4. The character input system according to claim 1,
wherein the first information processing apparatus decides whether or not a first ID associated with startup of a character input processing in the first information processing apparatus matches a second ID associated with the second information processing apparatus, and
if there is no match, then character string input by the second information processing apparatus is restricted,
if there is a match, then concurrent character suing input by the first information apparatus and the second information processing apparatus is allowed.

5. A character string input apparatus comprising:
an operation acquisition block configured to acquire an operation done on a first input device by a user;
a character string acquisition block configured to acquire a first character string on a basis of the acquired operation;
a reception block configured to acquire a second character string entered on a second input device of a second character string input apparatus by the user; and
a character string output block configured to output an input character string to an application program,
wherein the input character string is a combination of the first character string and the second character string.

6. A character string input method comprising:
by an operation acquisition block, acquiring an operation done on an input device by a user;
by a character string acquisition block, acquiring a character string on a basis of the acquire operation; and
by a reception block, acquiring a second character string entered on a second input device of a second character string input apparatus by the user;
by a character string output block, outputting an input character string to an application program,
wherein the input character string is a combination of the first character string and the second character string.

7. A non-transitory computer-readable information storage medium configured to store a program for a computer, the program comprising:
by an operation acquisition block, acquiring an operation done on an input device by a user;
by a character string acquisition block, acquiring a character string on a basis of the acquire operation;
by a reception block, acquiring a second character string entered on a second input device of a second character string input apparatus by the user; and
by a character string output block, outputting an input character string to an application program,
wherein the input character string is a combination of the first character string and the second character string.

* * * * *